(12) United States Patent
Zhang et al.

(10) Patent No.: US 11,621,813 B2
(45) Date of Patent: Apr. 4, 2023

(54) GROUP COMMON DEMODULATION REFERENCE SIGNALS WITH TIME DOMAIN WAVEFORM

(71) Applicant: QUALCOMM Incorporated, San Diego, CA (US)

(72) Inventors: Xiaoxia Zhang, San Diego, CA (US); Jing Sun, San Diego, CA (US); Zhifei Fan, San Diego, CA (US); Jun Ma, San Diego, CA (US); Wooseok Nam, San Diego, CA (US); Iyab Issam Sakhnini, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 123 days.

(21) Appl. No.: 17/203,624

(22) Filed: Mar. 16, 2021

(65) Prior Publication Data

US 2022/0303084 A1    Sep. 22, 2022

(51) Int. Cl.
*H04L 5/00*        (2006.01)
*H04L 27/26*       (2006.01)
*H04W 72/0446*     (2023.01)

(52) U.S. Cl.
CPC ........ *H04L 5/0048* (2013.01); *H04L 27/2605* (2013.01); *H04W 72/0446* (2013.01)

(58) Field of Classification Search
CPC ... H04L 5/0048; H04L 27/2605; H04L 5/005; H04L 5/0051; H04W 72/0446; H04W 72/044; H04W 72/0466; H04W 72/042; H04W 72/0413
See application file for complete search history.

(56) References Cited

U.S. PATENT DOCUMENTS

| 2011/0007730 A1* | 1/2011 | Han ..................... H04L 27/2602 370/342 |
| 2016/0197756 A1* | 7/2016 | Mestdagh ........... H04L 27/2615 375/295 |
| 2017/0150486 A1* | 5/2017 | Ang .......................... H04J 1/02 |

(Continued)

OTHER PUBLICATIONS

Wu et al., "A Field Trial of f-OFDM toward 5G", Proe. IEEE Globecom Workshop, pp. 1-6, Dec. 2016.*

(Continued)

*Primary Examiner* — Shah M Rahman
(74) *Attorney, Agent, or Firm* — Procopio, Cory, Hargreaves & Savitch LLP

(57) ABSTRACT

The apparatus is configured to transmit and/or receive GDMRS that may be scrambled based on a same scrambling identifier (ID) and shared for a plurality of UEs or channels. The apparatus, in some configurations, is further configured to multiplex, in time, data for the plurality of UEs or channels into different segments within each symbol in a set of symbols. The apparatus is further configured to transmit and/or receive the multiplexed data for the plurality of UEs or channels. In some configurations, the apparatus is further configured to demodulate the received data based on the GDMRS, and extract at least one segment for a UE or a plurality of channels associated with the apparatus within the demodulated data for subsequent decoding at the apparatus. In some configurations the extraction is based on a SLIV transmitted and/or received by the apparatus.

15 Claims, 21 Drawing Sheets

(56) References Cited

U.S. PATENT DOCUMENTS

| | | | |
|---|---|---|---|
| 2017/0208568 A1* | 7/2017 | Nam | H04L 5/0048 |
| 2019/0149365 A1 | 5/2019 | Chatterjee et al. | |
| 2019/0190687 A1* | 6/2019 | Yi | H04L 5/1469 |
| 2020/0163104 A1* | 5/2020 | Du | H04W 72/1268 |
| 2020/0220681 A1 | 7/2020 | Yang et al. | |
| 2020/0359411 A1* | 11/2020 | Li | H04W 72/1273 |
| 2021/0022044 A1 | 1/2021 | Zhang et al. | |
| 2021/0314984 A1* | 10/2021 | Yang | H04L 5/0078 |
| 2021/0337548 A1* | 10/2021 | Gao | H04W 72/23 |
| 2021/0378009 A1* | 12/2021 | Wu | H04W 16/14 |
| 2022/0150016 A1* | 5/2022 | Shen | H04L 27/2613 |
| 2022/0217756 A1* | 7/2022 | Wu | H04L 27/2602 |
| 2022/0239433 A1* | 7/2022 | Kim | H04L 5/0048 |

OTHER PUBLICATIONS

International Search Report and Written Opinion—PCT/US2022/016643—ISA/EPO—dated May 30, 2022.

* cited by examiner

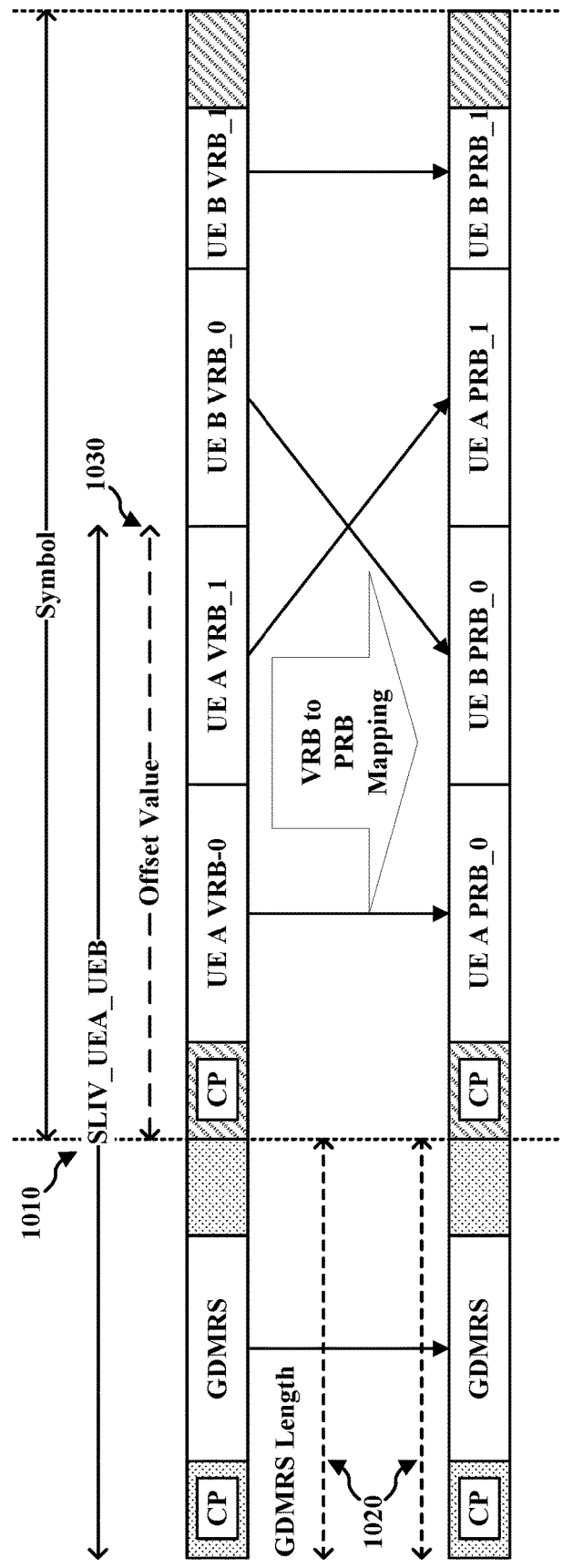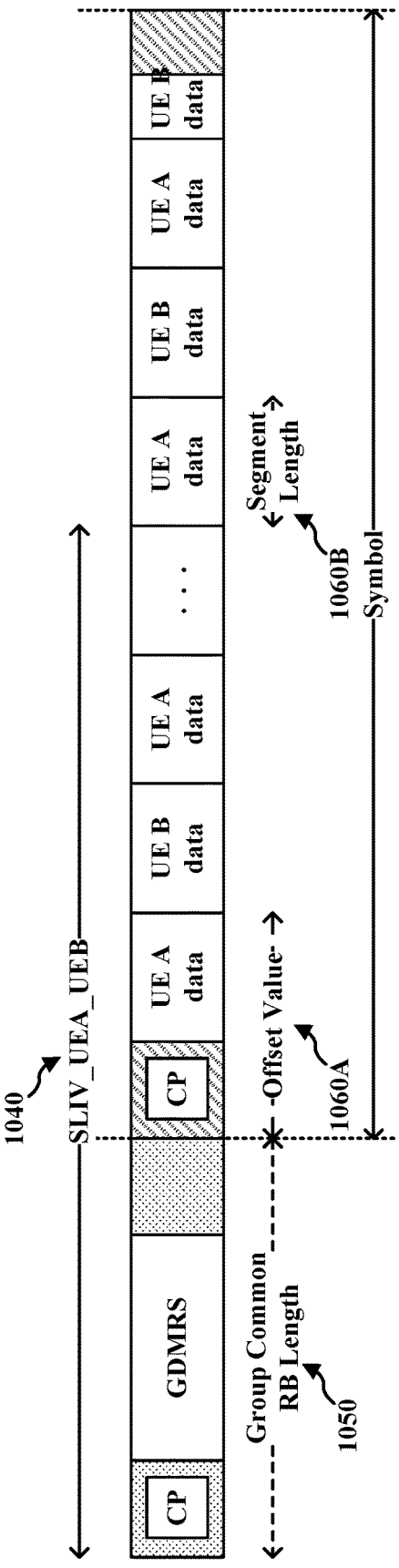
FIG. 10A
FIG. 10B

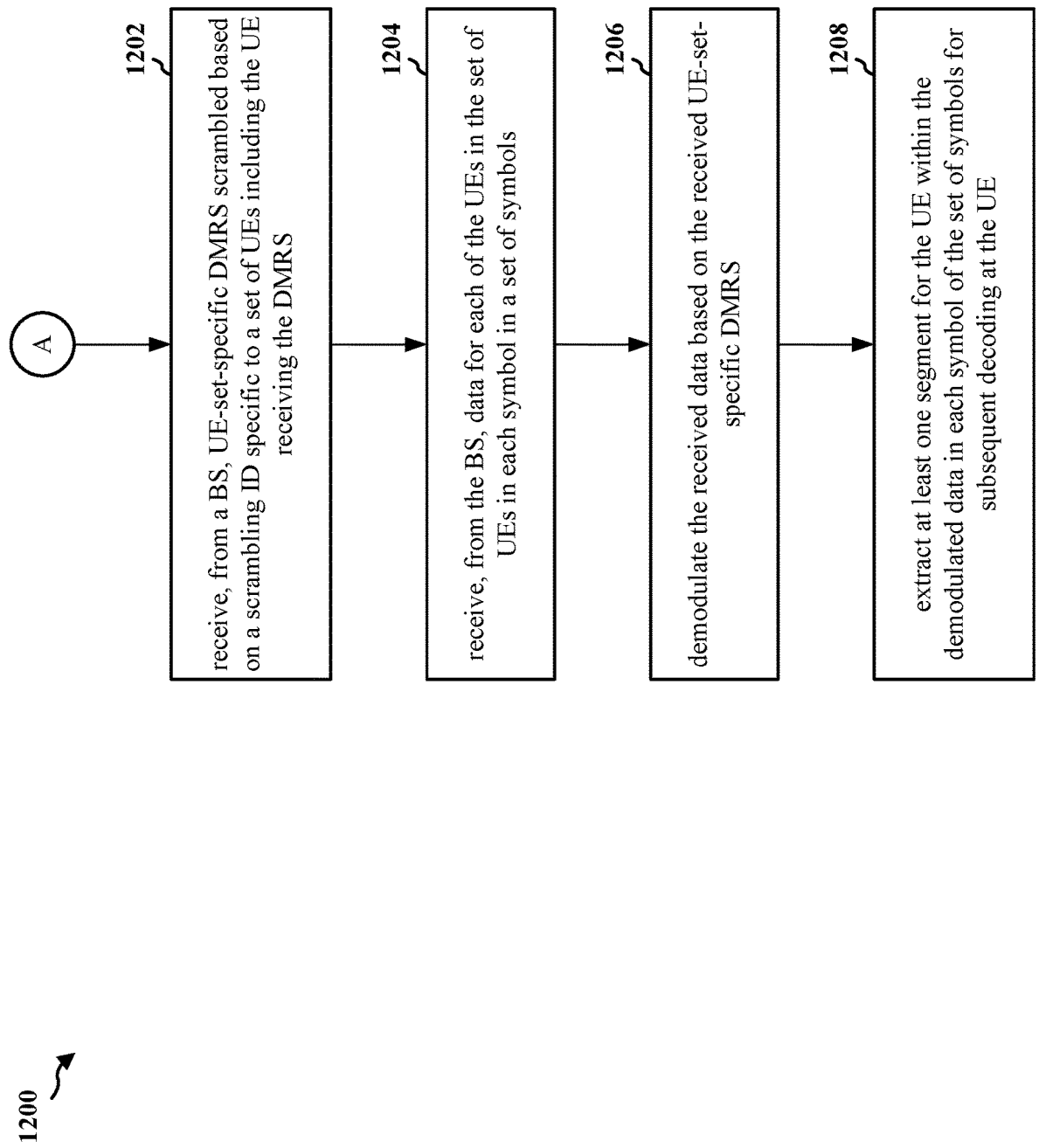

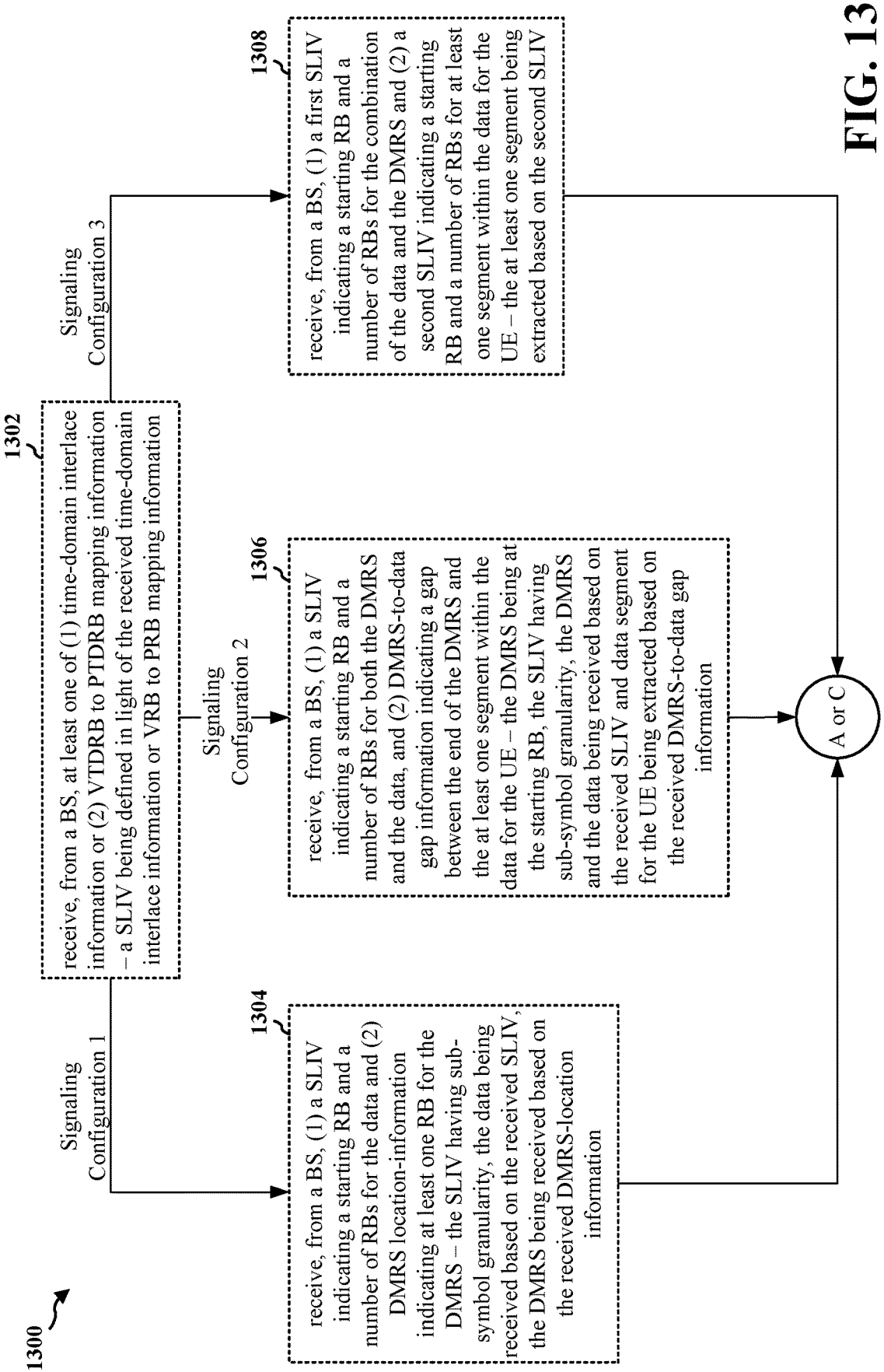

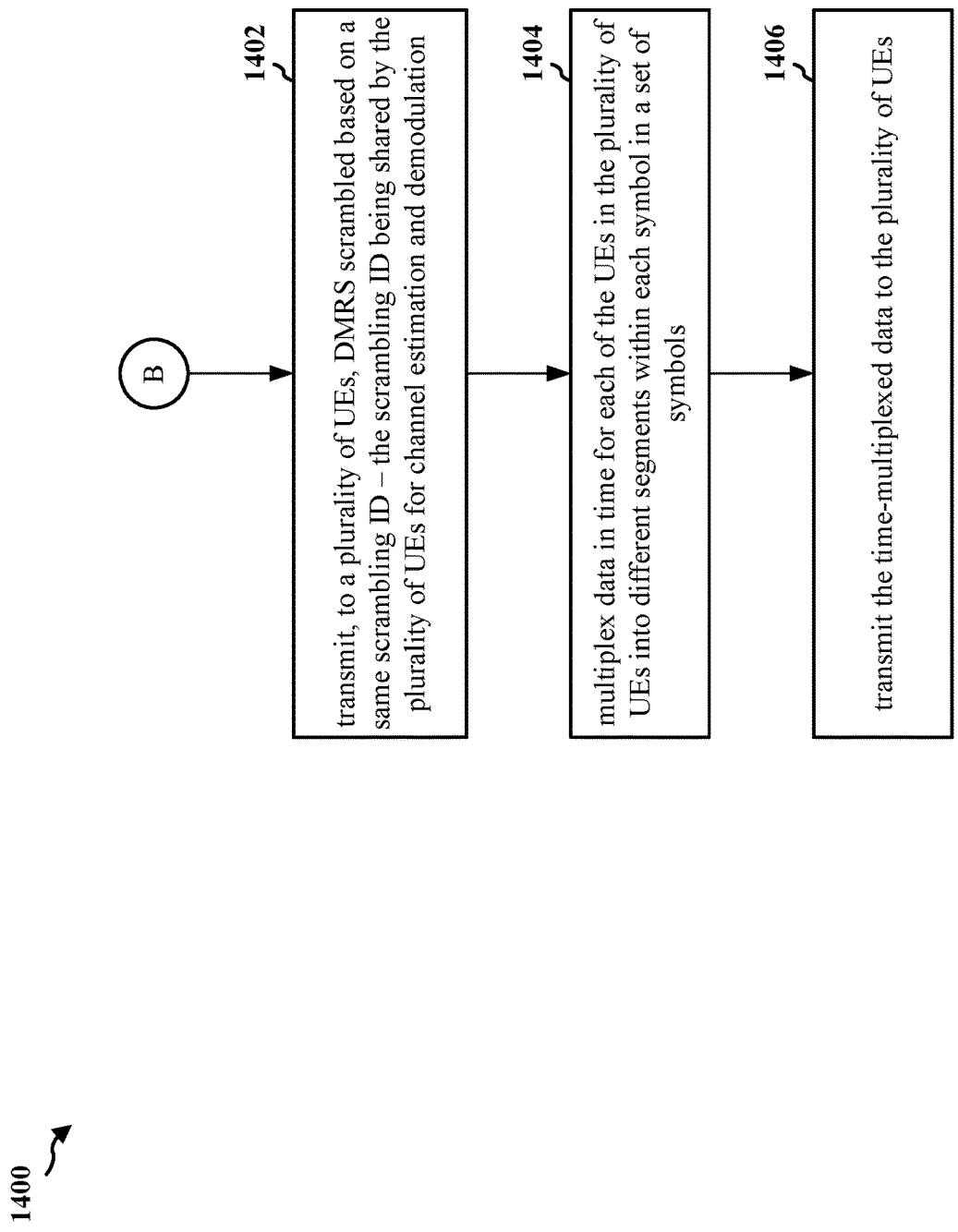

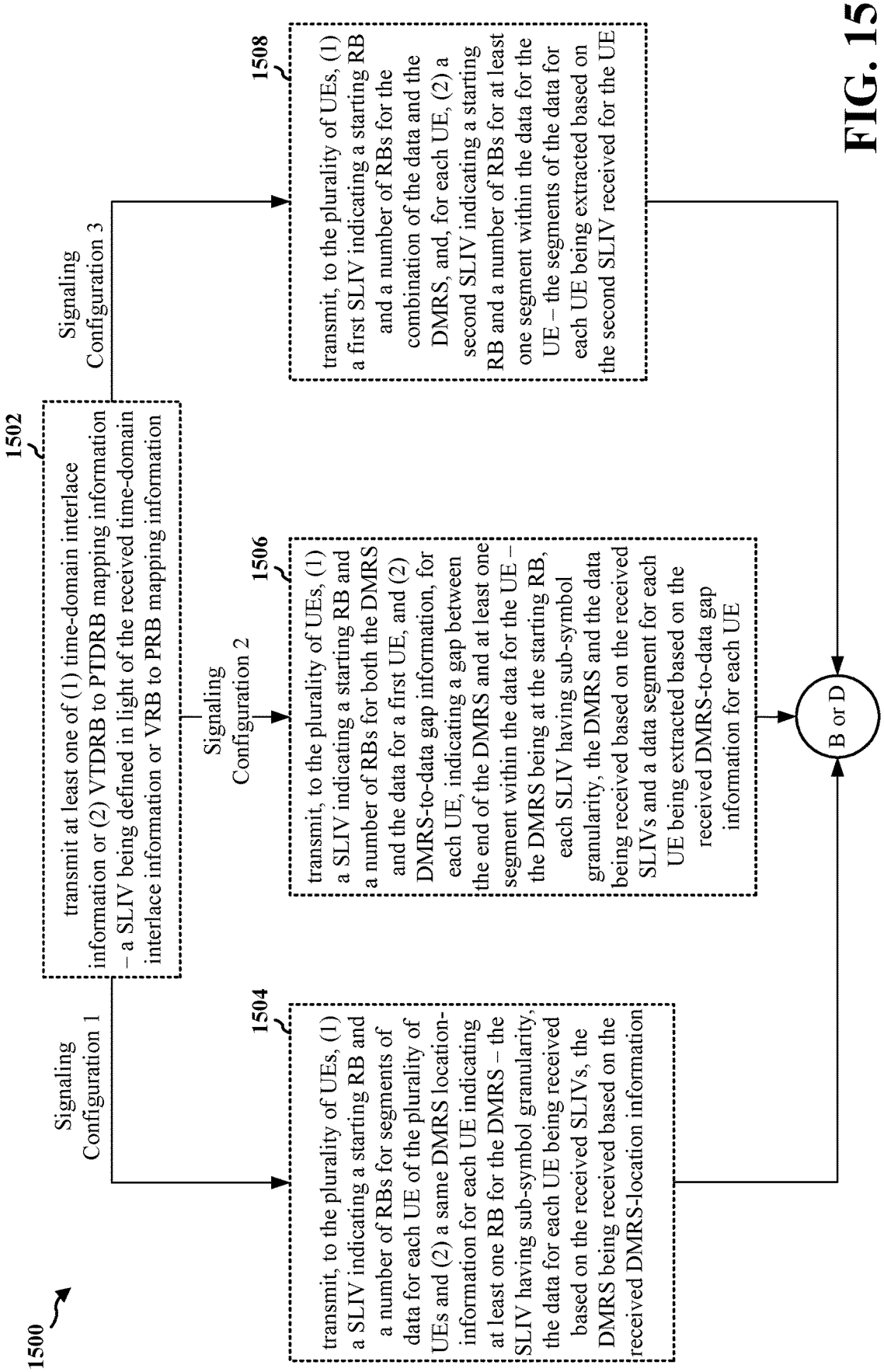

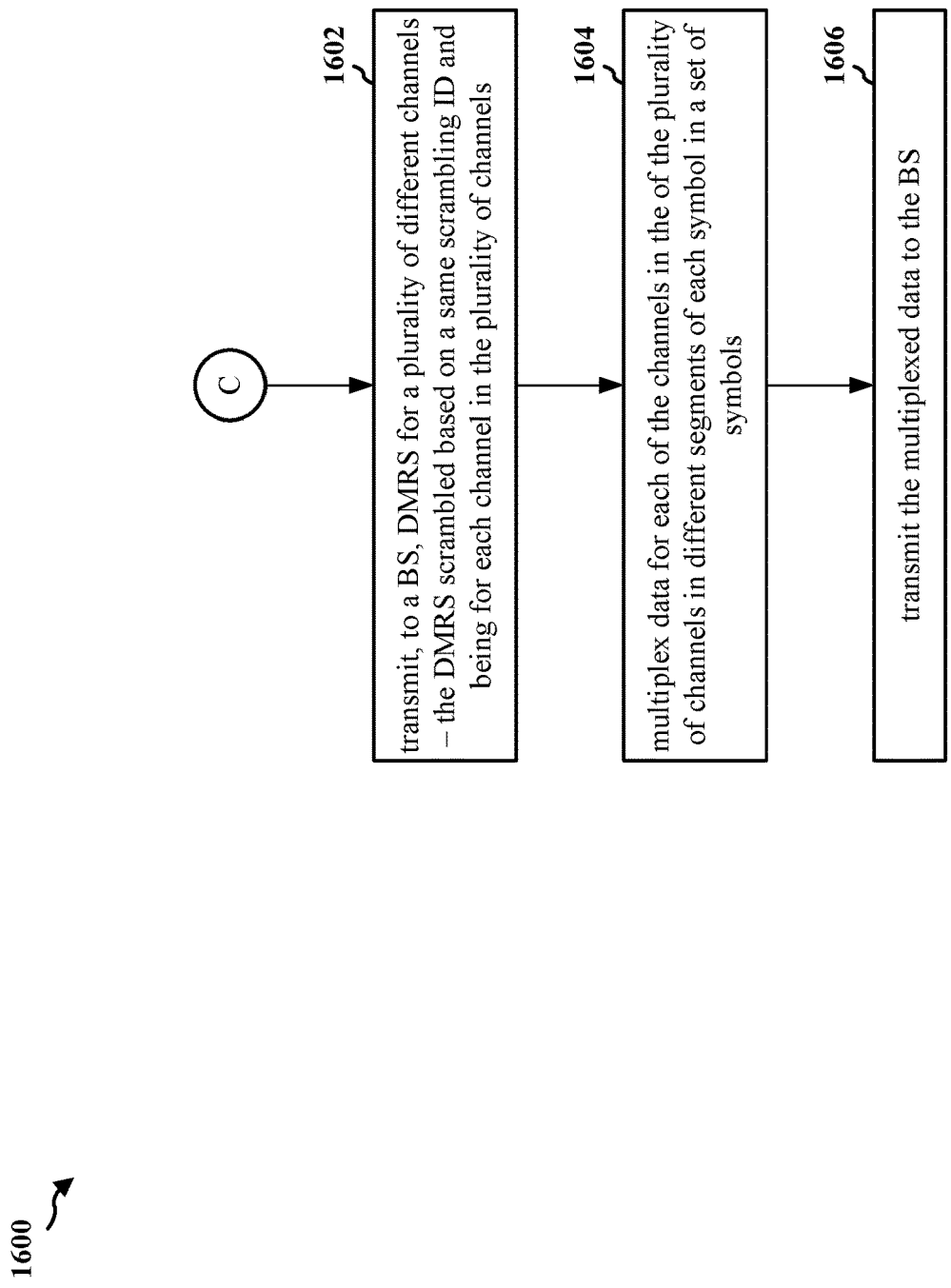

GROUP COMMON DEMODULATION REFERENCE SIGNALS WITH TIME DOMAIN WAVEFORM

BACKGROUND

Technical Field

The present disclosure relates generally to communication systems, and more particularly, and more particularly to demodulation reference signal (DMRS) common to more than one user equipment (UE) or to more than one channel.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

As more data can be transmitted in shorter time periods, there may be opportunity to increase the efficiency of data transmission for multiple users or multiple channels. In systems using SC-FDMA or SC quadrature amplitude modulation (SC-QAM), data for different channels or users may consume less than an entire symbol to be transmitted. Accordingly, systems that can transmit data for different channels or different users within a symbol may be provided to take advantage of these conditions.

In an aspect of the disclosure, a method, a computer-readable medium, and an apparatus are provided. The apparatus may be a device at a UE. The device may be a processor and/or modem at a UE or the UE itself. The device may be configured to transmit, to a base station (BS), a group-common DMRS (GDMRS) that is common to (or shared by) multiple channels (e.g., physical uplink control channel (PUCCH) and physical uplink shared channel (PUSCH)) and/or to receive, from a BS, a GDMRS that is common to (or shared by) multiple users (e.g., multiple UEs) or multiple channels (e.g., physical downlink control channel (PDCCH) and physical downlink shared channel (PDSCH)) for performing channel estimation. A GDMRS common to multiple channels or multiple users may be a GDMRS that is scrambled based on a same scrambling value (e.g., a scrambling value identified by a scrambling ID) that is associated with each UE or channel for which channel estimation is performed. The device may be further configured to multiplex data for the multiple channels associated with a GDMRS into different segments of each symbol in a set of symbols and to transmit the multiplexed data to the BS. In some configurations, the device may additionally, or alternatively, be configured to receive, from a BS, data for each of the multiple UEs and/or channels sharing the GDMRS in each symbol in a set of symbols. The device, in such configurations, may be configured to demodulate received data based on the GDMRS and to extract at least one segment of the data that is for the device within the demodulated data in each symbol of the set of symbols for subsequent decoding at the device.

In an aspect of the disclosure, a method, a computer-readable medium, and an apparatus are provided. The apparatus may be a device at a BS. The device may be a processor and/or modem at a BS or the BS itself. The device may be configured to transmit a GDMRS to a set of multiple UEs, the GDMRS being scrambled based on a scrambling value (e.g., a scrambling value identified by a scrambling identifier) that each UE in the set of UEs can use to perform channel estimation based on the GDMRS. The device may be configured to multiplex data for each UE in the set of UEs in each symbol of a set of symbols and transmit the multiplexed data to the set of UEs. In some configurations, the device may be additionally, or alternatively, configured to receive, from a UE, a GDMRS that is shared by multiple channels, the GDMRS being scrambled based on a scrambling value (e.g., a scrambling value identified by a scrambling identifier) that is associated with each channel for which channel estimation is performed. The device, in such configurations, may be configured to receive, from a UE, data for the multiple channels within each symbol of a set of symbols. The device may be further configured in such configurations to demodulate the received data for the multiple channels based on the GDMRS and to extract segments for the multiple different channels within the demodulated data in each symbol of the set of symbols for subsequent decoding at the BS with each different extracted segment corresponding to a different channel of the multiple channels.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 10A illustrates a set of values defining sets of TDRBs in a virtual TDRB (VTDRB) space that include the VTDRBs for the GDMRS and the VTDRBs for the data for each of a set of UEs and/or channels within a symbol or set of symbols.

FIG. 10B illustrates a set of three values that are used to define the start position and the length for (1) the GDMRS, (2) the data for a first UE or channel, and (3) the data for a second UE or channel.

FIG. 12 is a flowchart of a method of wireless communication.

FIG. 13 is a flowchart of additional operations that may be performed prior to the operations illustrated in FIG. 12.

FIG. 14 is a flowchart of a method of wireless communication.

FIG. 15 is a flowchart of additional operations that may be performed prior to the operations illustrated in FIG. 14.

FIG. 16 is a flowchart of a method of wireless communication.

DETAILED DESCRIPTION

Figure 1:
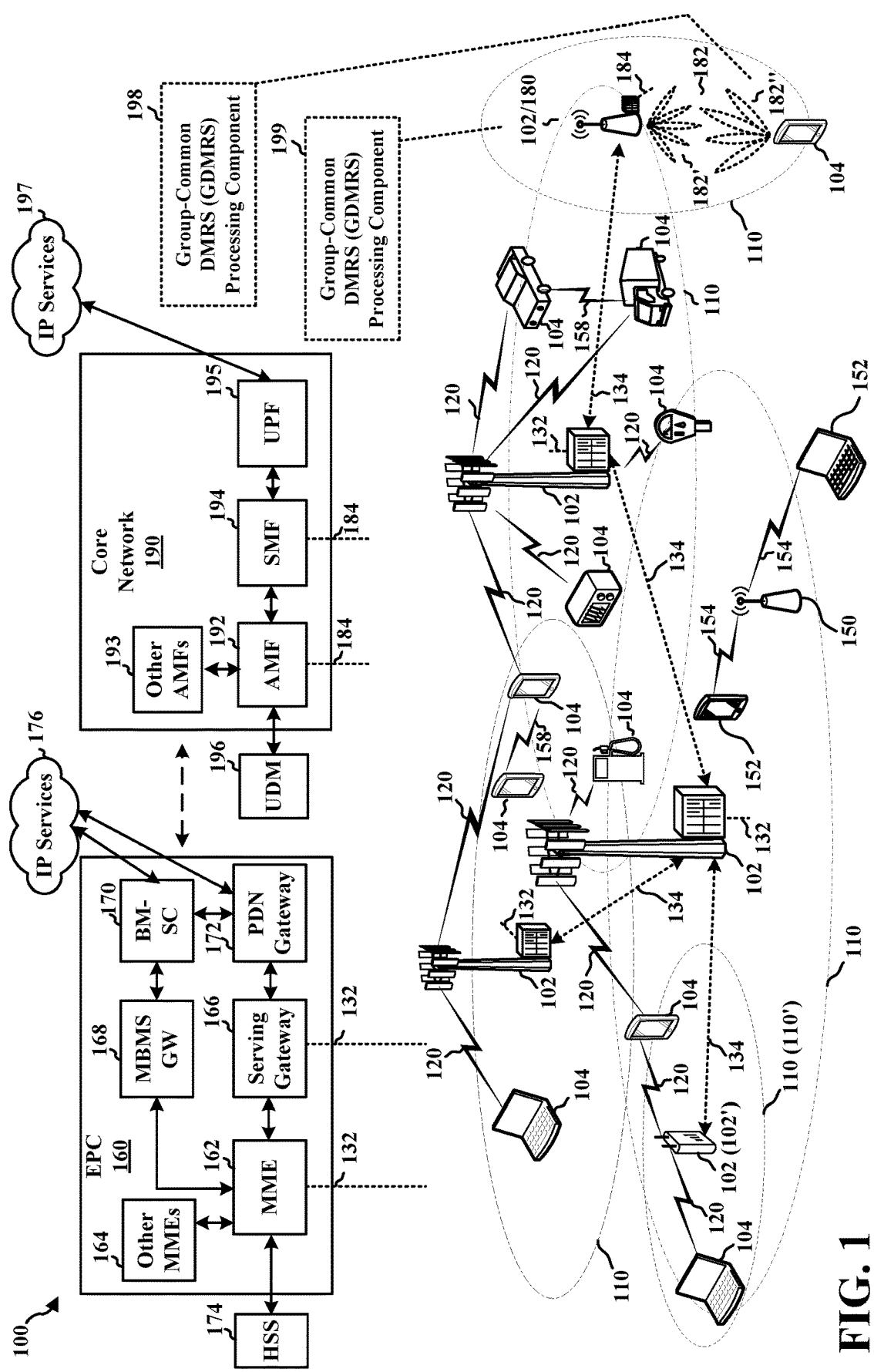
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a GDMRS processing component 198 that is configured to receive, from a base station, DMRS, the DMRS being UE-set-specific to a plurality of UEs including the UE, the UE-set-specific DMRS being scrambled based on a same scrambling identifier (ID) and being shared for the plurality of UEs; receive, from the base station, data for the plurality of UEs multiplexed in time within each symbol of a set of symbols; demodulate the received data based on the received UE-set-specific DMRS; and extract at least one segment for the UE within the demodulated data in each symbol of the set of symbols for subsequent decoding at the UE. GDMRS processing component 198 may also be configured to transmit, to a base station, DMRS for a plurality of different channels, the transmitted DMRS being scrambled based on a same scrambling identifier (ID) and being for each channel of the plurality of different channels; multiplex, in time, data for the plurality of different channels into different segments within each symbol of a set of symbols; and transmit the multiplexed-in-time data to the base station.

In certain aspects, the base station 180 may include a GDMRS processing component 199 that is configured to transmit DMRS to a plurality of UEs, the transmitted DMRS being scrambled based on a same scrambling ID and being shared by each UE of the plurality of UEs for channel estimation and demodulation at the plurality of UEs; multiplex data for a plurality of UEs into different segments within each symbol of a set of symbols; and transmit the multiplexed data to the plurality of UEs. GDMRS processing component 199 may also be configured to receive, from a UE, DMRS for a plurality of different channels, the received DMRS being scrambled based on a same scrambling ID and being for each channel of the plurality of different channels; receive, from the UE, data for the plurality of different channels within each symbol of a set of symbols; demodulate the received data for the plurality of different channels based on the received DMRS; and extract segments for the plurality of different channels within the demodulated data in each symbol of the set of symbols for subsequent decoding at the BS, each segment corresponding to a different channel of the plurality of different channels.

Figure 2:
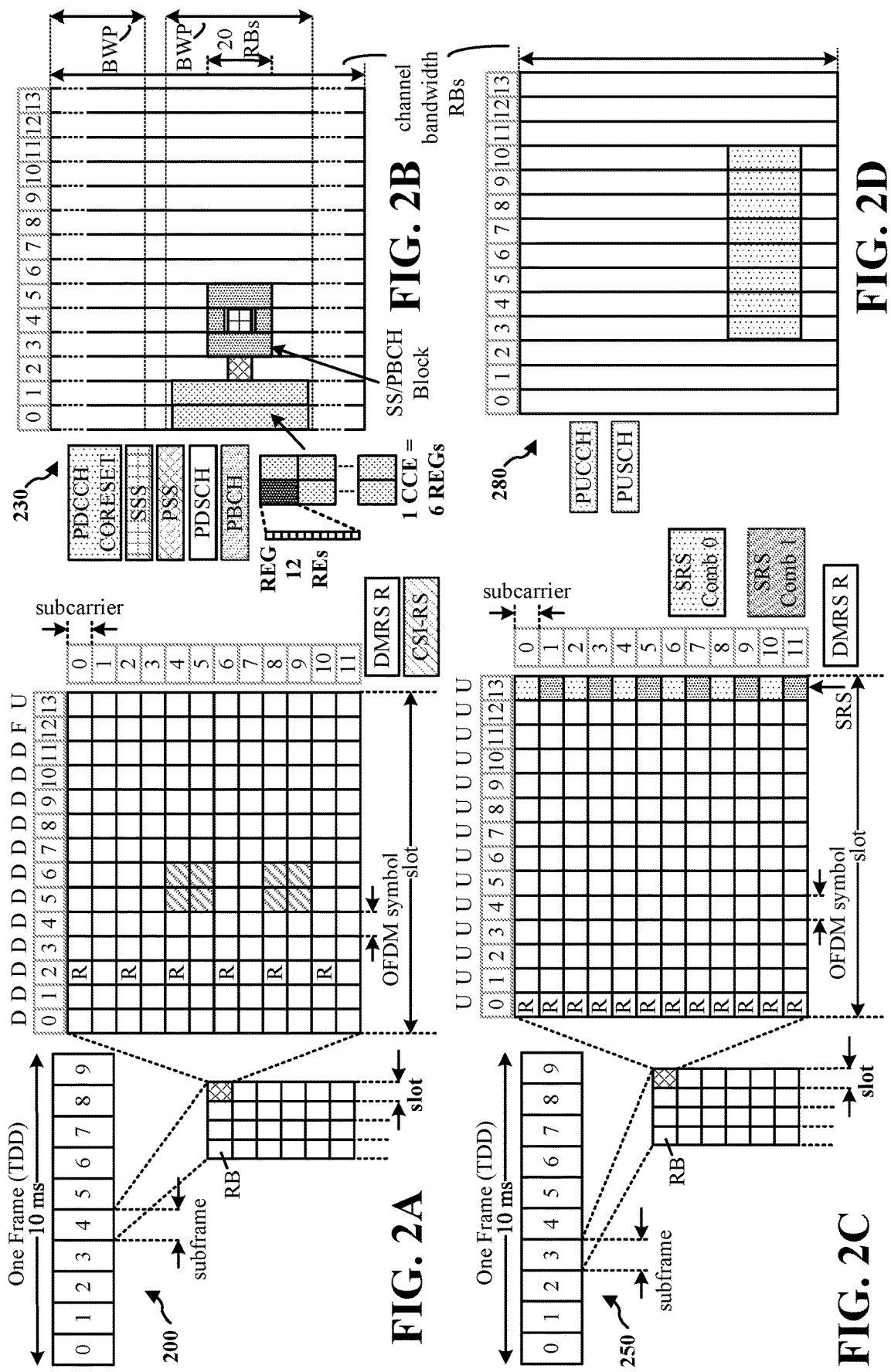
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
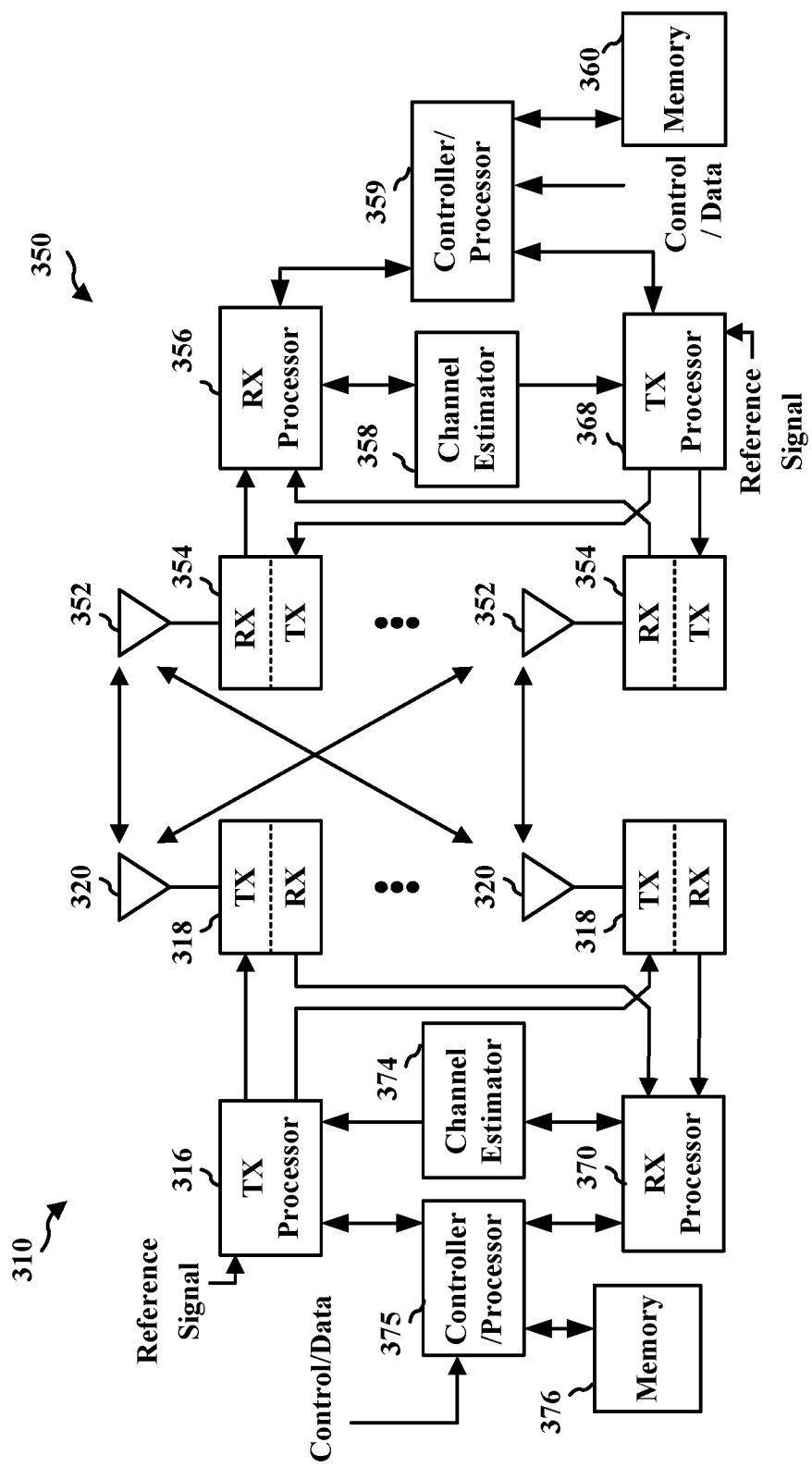
FIG. 3 is a diagram illustrating an example of a base station and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354 TX. Each transmitter 354 TX may modulate an RF carrier with a respective spatial stream for transmission.

The UL transmission is processed at the base station 310 in a manner similar to that described in connection with the receiver function at the UE 350. Each receiver 318 RX receives a signal through its respective antenna 320. Each receiver 318 RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 199 of FIG. 1.

As more data can be transmitted in shorter time periods, there may be opportunity to increase the efficiency of data transmission for multiple users or multiple channels. In systems using SC-FDMA or SC quadrature amplitude modulation (SC-QAM), data for different channels or users may consume less than an entire symbol to be transmitted. Accordingly, systems that can transmit data for different channels or different users within a symbol may be provided to take advantage of these conditions. It may also be beneficial to avoid introducing additional cyclic prefixes for each sub-symbol segment of data within a single symbol to avoid adding additional system overhead or incurring additional complexity or restrictions based on FFT and/or DFT size for frequency domain processing.

Figure 4:
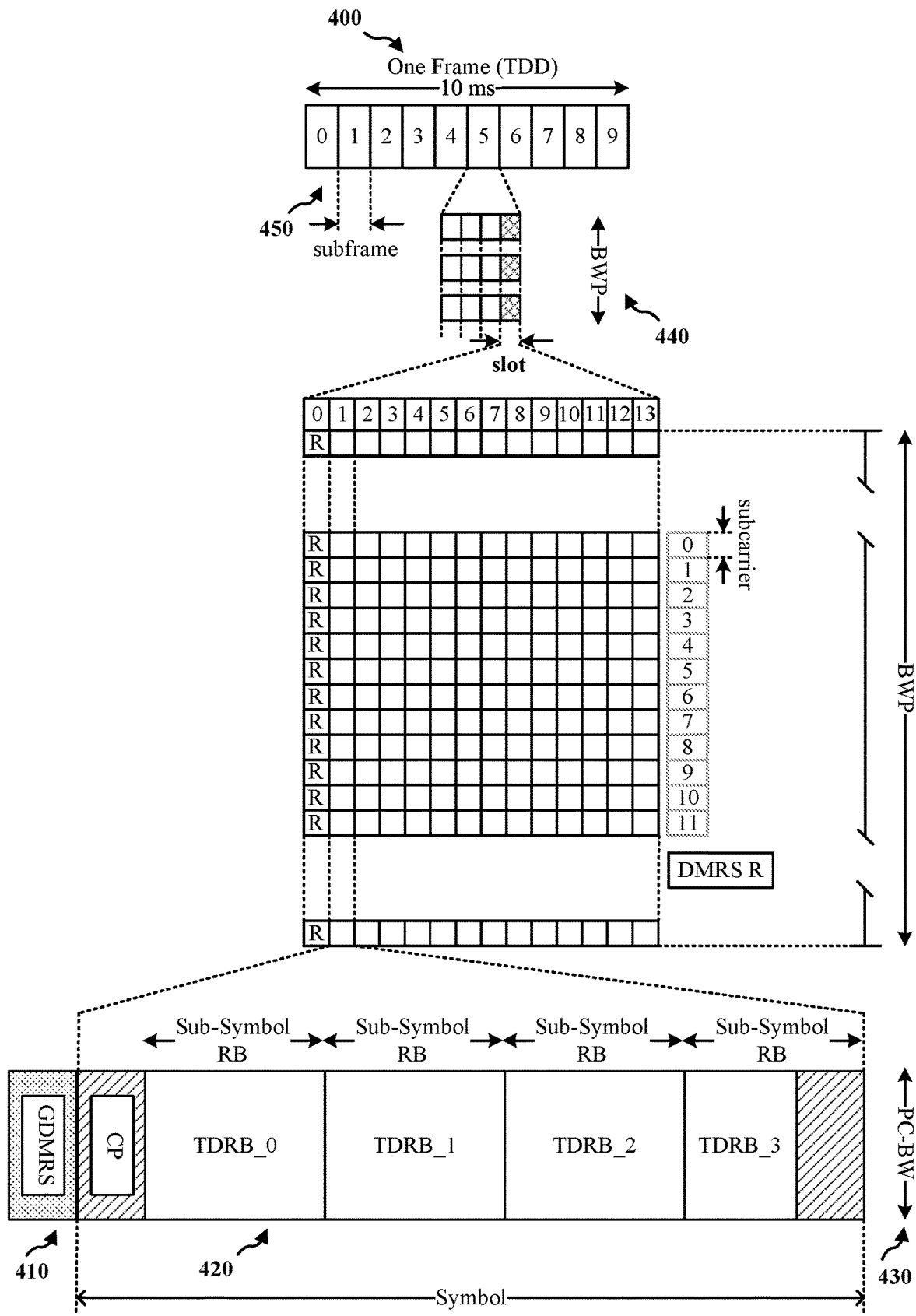
FIG. 4 is a diagram illustrating an example of a single symbol in a 5G NR frame structure being divided into multiple sub-symbol time-domain (TD) resource blocks (TDRBs).

FIG. 4 is a diagram 400 illustrating an example of a single symbol in a 5G NR frame structure 450 being divided into multiple sub-symbol time-domain resource blocks (also referred to as time-domain RBs (TDRBs) or simply RBs). As shown in FIG. 4, each frame may be subdivided into subframes, each subframe may be divided into a number of slots in time. Each slot may be further divided into a number of symbols. The symbols are then further subdivided into TDRBs 420. The number of time domain samples (i.e., time domain resource elements) in TDRBs in a given symbol may be a power of two (e.g., 2, 4, 8, etc.) or factor of small prime numbers (e.g., two, three, five, etc.) to avoid complexity and/or restriction with FFT or DFT frequency domain processing. For example, if a symbol spans 4096 (as an example of a power of 2) samples, dividing the samples into a number of segments that is a power of two allows the application of an FFT or DFT to a number of samples that is a power of 2.

FIG. 4 further illustrates that a particular symbol may be preceded by a GDMRS 410 that may be used to demodulate the signal before extracting (at a UE and/or BS) segments (TDRBs or TDRB groups (TDRBGs)) for particular users or channels. A particular set of GDMRS and TDRBs with data for different users and/or channels span a pre-configured bandwidth 430 that may be included in BWP 440. The GDMRS 410 may be scrambled based on a particular scrambling identifier that identifies a scrambling sequence. The scrambling identifier may be an initialization value for a sequence generation algorithm or a set of values (e.g., $n_{RNTI}$ and $n_{ID}$) that are used to calculate an initialization value for a sequence generation algorithm. The initialization value or set of values may be UE-specific, in which case each UE using the GDMRS 410 may be provided with a same initialization value or set of values used to calculate the initialization value. For example, if pdcch-DMRS-ScramblingID is configured, a group of UEs may be assigned a common $n_{RNTI}$ and $n_{ID}$ for determining a scrambling sequence.

Figure 5:
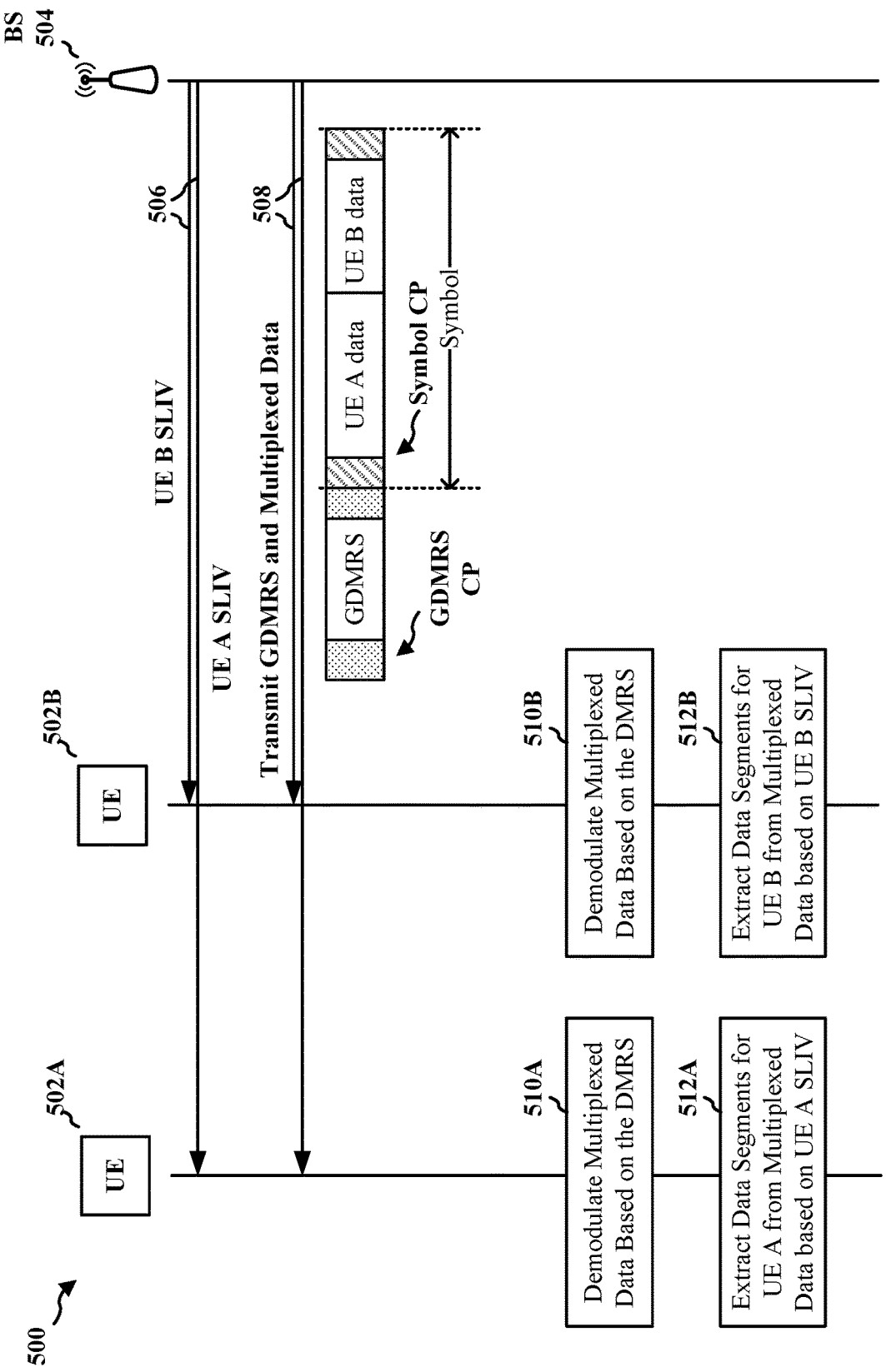
FIG. 5 is a call flow diagram illustrating a group-common DMRS (GDMRS) in a first symbol and data for two different UEs being transmitted by a BS in a same symbol to be segmented based on start and length indicator values (SLIVs) for the two different UEs.

FIG. 5 is a call flow diagram 500 illustrating a GDMRS in a first symbol and data for two different UEs 502A and 502B being transmitted by a BS 504 in a same symbol to be segmented based on SLIVs for UEs 502A and 502B. As shown, a SLIV for each of UEs 502A and 502B (i.e., SLIV A and SLIV B, respectively) is transmitted in a first communication 506. The SLIVs for UEs 502A and 502B are used by the UEs 502A and 502B to identify the location of the GDMRS and the data segments for the UEs 502A and 502B, respectively. The SLIVs for UEs 502A and 502B may take any of the formats discussed below in relation to FIGS. 9A-11B or equivalent formats indicating the locations of a GDMRS and data segments for each UE in a set of UEs using the GDMRS.

FIG. 5 illustrates a second transmission 508 that includes the GDMRS and the data for UEs 502A and 502B. Transmissions 506 and 508 may be sent in a same communication frame and/or slot. When transmitted in a same slot, communication 506 may be transmitted in a symbol that may be transmitted before the transmitted symbol that includes the GDMRS and the UE data to allow for the GDMRS and UE data to be demodulated and extracted based on the SLIV transmission 506. SLIVs for UEs 502A and 502B may be transmitted via any of RRC signaling, a MAC control element (CE) (MAC-CE), or DCI (i.e., through a PDCCH).

UEs 502A and 502B receive the SLIV transmission 506 and the multiplexed data transmission 508. The UEs 502A and 502B may demodulate 510A and 510B, respectively, the multiplexed data based on the GDMRS. After demodulation, UEs 502A and 502B may extract 512A and 512B data segments for UE 502A and UE 502B based on the UE A SLIV and UE B SLIV, respectively. The data segments extracted by UEs 502A and 502B may then be decoded at the UEs 502A and 502B, respectively.

Figure 6:
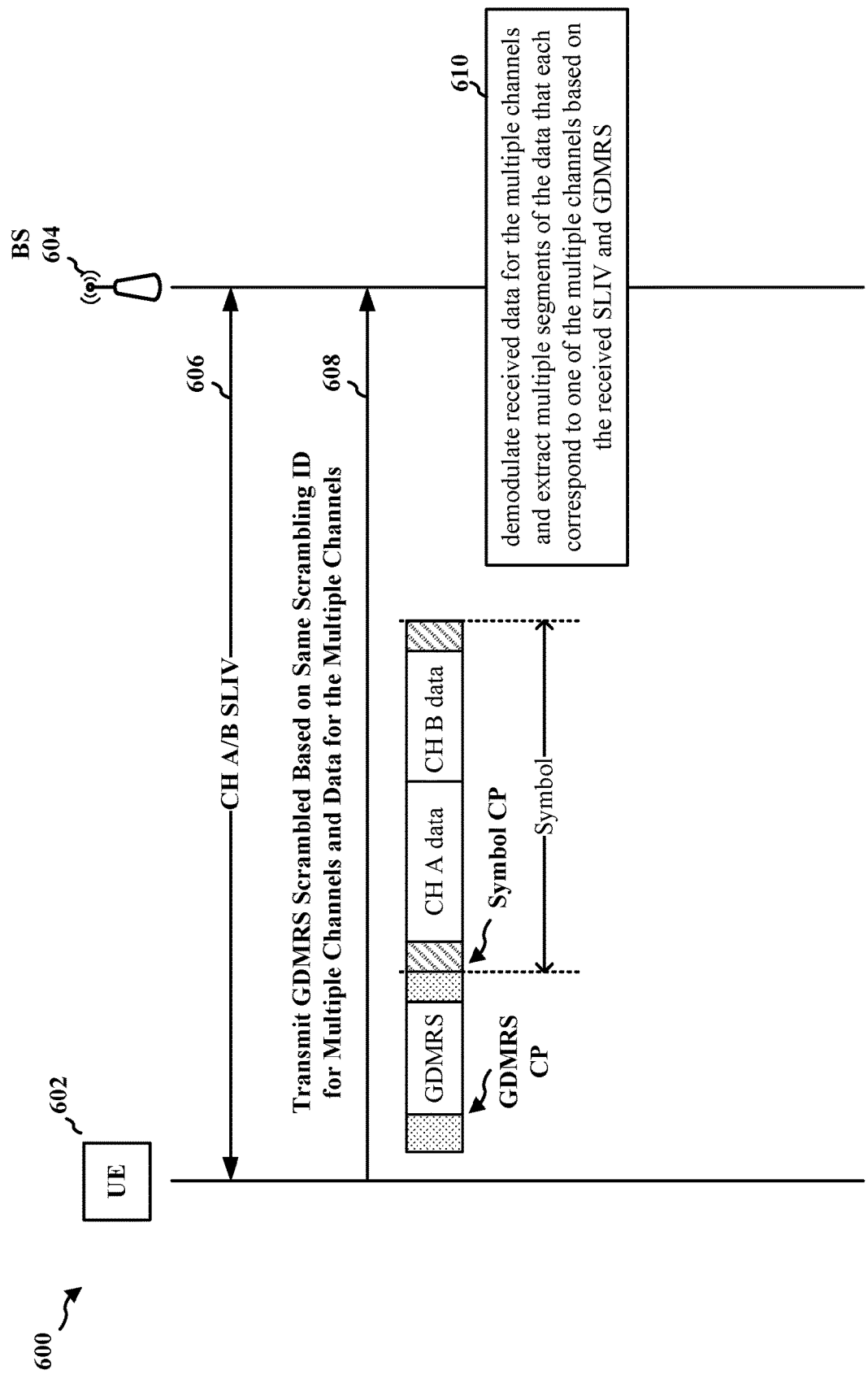
FIG. 6 is a call flow diagram illustrating a GDMRS in a first symbol and data for two different channels being transmitted by a UE in a same symbol to be segmented based on SLIVs for the different channels.

FIG. 6 is a call flow diagram 600 illustrating a GDMRS in a first symbol and data for two different channels (e.g., PUCCH, PUSCH, etc.) being transmitted by a UE 602 in a same symbol to be segmented based on SLIVs for the different channels (e.g., channel A and channel B). As shown, a SLIV for channels A and B (i.e., CH AB SLIV) may be transmitted in a first communication 606. Communication 606 may include a transmission from the BS 604 that is received at the UE 602 and/or a transmission from the UE 402 that is received at the BS 604. The SLIVs for channels A and B may be used by BS 604 to identify the location of the GDMRS and the data segments for channel A and channel B, respectively. The SLIVs for channels A and B may take any of the formats discussed below in relation to FIGS. 9A-11B or equivalent formats indicating the locations of a GDMRS and data segments for each channel in a set of channels using the GDMRS.

FIG. 6 illustrates a second communication 608 that includes the GDMRS and the data for multiple channels (e.g., channels A and B). Communications 606 and 608 may be transmitted in a same communication frame and/or slot.

When transmitted in a same slot, communication 606 may be transmitted in a symbol that may be transmitted before the transmitted symbol that includes the GDMRS and the channel data to allow for the GDMRS and channel data to be demodulated and extracted based on the SLIVs for channels A and B included in communication 606. SLIVs for channels A and B may be transmitted via any of a MAC-CE, or DCI (i.e., through PDCCH) for configurations in which the SLIVs for channels A and B are determined by, and transmitted from, the BS 604. Alternatively, or additionally, SLIVs for channels A and B may be transmitted via any of a MAC-CE, or UCI (i.e., through PUCCH) for configurations in which the SLIVs for channels A and B are determined by, and transmitted from, the UE 602.

BS 604 may receive the time-multiplexed data in communication 608 based on the SLIVs for channels A and B included in communication 606. The BS 604 may demodulate 610 the received data for the multiple channels and extract multiple segments of the data that each correspond to one of the multiple channels based on the SLIVs for channels A and B included in communication 606 and the GDMRS. The received data for the multiple channels may then be decoded at the BS 604.

Figure 7:
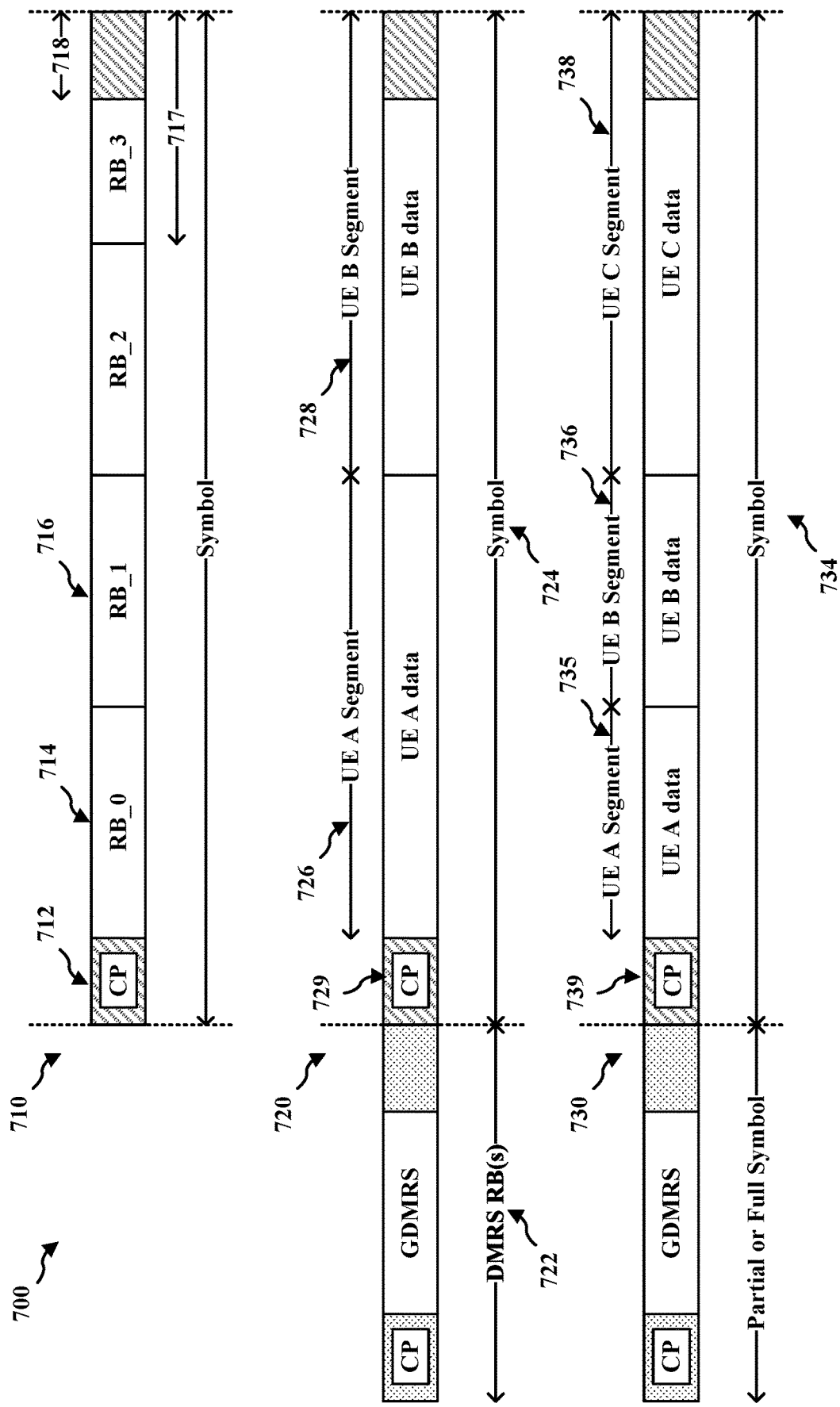
FIG. 7 is a diagram illustrating an example division of a symbol into TDRBs and example multiplexed data structures in a single symbol.

FIG. 7 is a diagram 700 illustrating an example division of a symbol 710 into TDRBs and example multiplexed data structures 720 and 730 in a single symbol. Symbol 710 may be divided into 4 TDRBs (e.g., TDRBs 714 and 716) and may include a cyclic prefix 712 that is a copy of the data 718 at the end of the symbol that may be part of the data included in TDRB 717. Symbol structure 720 illustrates a full or partial symbol including a GDMRS in DMRS RBs (e.g., TDRBs or resource elements (REs)) 722 and a symbol 724 including data for two UEs (e.g., UE A and UE B). The data for UE A may be in a first segment 726 and the data for UE B may be in a second segment 728. While symbol 724 includes data for both UE A and UE B, in some aspects a symbol including data for a first UE in a first segment and data for a second UE in a second segment may be preceded by one or more symbols including data for only the first UE and may be followed by one or more symbols including data for only the second UE. Similarly, additional examples provided below in FIGS. 8-11B of multiplexed data structures including data for a first UE in a first segment and data for a second UE in a second segment may be preceded and followed by symbols including data for the first UE (or channel) and the second UE (or channel), respectively.

Symbol structure 730 illustrates a full or partial symbol including a GDMRS and a symbol 734 including data for three UEs (e.g., UE A, UE B, and UE C). The segments 735 and 736 for UE A and UE B, respectively, each may span a single TDRB while the segment 738 for UE C may span two TDRBs. Each symbol 724 and 734 may have its own CP 729 and 739 and, if the GDMRS is transmitted in a partial symbol, the GDMRS may have its own CP as well. As shown, the UE data segments 726, 728, 735, 736, and 738 may not have individual CPs separate from the symbol CPs 729 and 739.

Not adding CP for each UE data segment allows the data to be divided into segments to which FFT or DFT can easily be applied. It may be easier to apply FFT or DFT on a number of samples that is a power of two and a symbol may be defined to contain a number of samples that is a power of two along with an additional number of samples for the symbol-level CP (e.g., 729 or 739). Accordingly, the number of samples available for data transmission may be a power of two that, when divided into a number of TDRBs that is also a power of two, is still a power of two to which FFT or DFT for the resulting number of samples can easily be applied. On the other hand, if CP is added for each TDRB, the amount of data may be reduced by the duplicative data that is sent in the CP and additional complexity may be introduced by applying FFT or DFT to a number of samples that is not a power of two (e.g., a power of two minus the number of samples in the CP).

Figure 8:
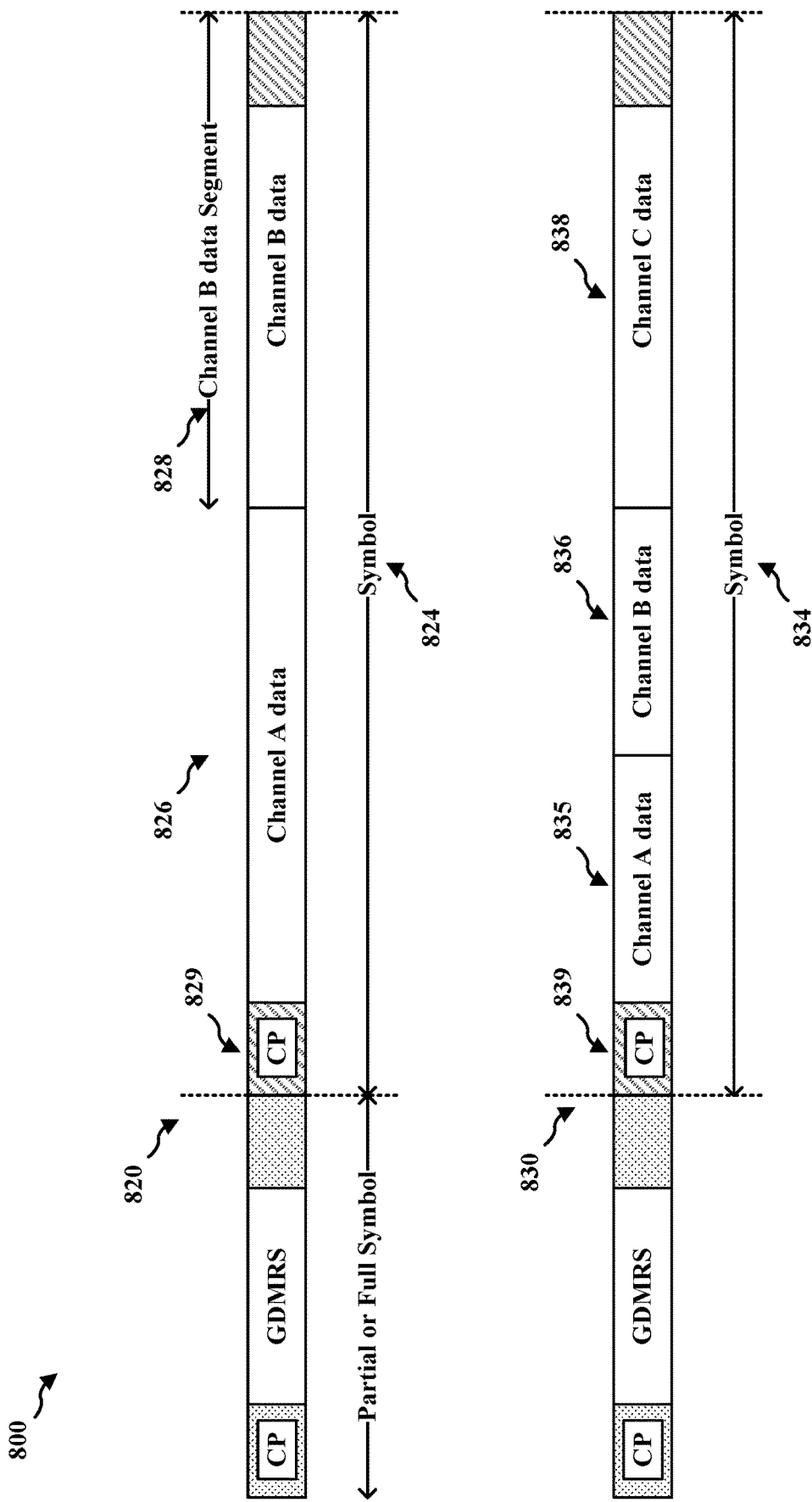
FIG. 8 is a diagram illustrating an example division of symbols into TDRBs carrying data for different channels.

FIG. 8 is a diagram 800 illustrating an example division of symbols 820 and 830 into TDRBs carrying data for different channels (e.g., channels A and B or A, B, and C). Symbol structure 820 illustrates a full or partial symbol including a GDMRS in a partial or full symbol prior to symbol 824 that includes data for channels A and B.

Symbol structure 830 illustrates a full or partial symbol including a GDMRS and a symbol 834 including data for three channels (e.g., channels A, B, and C). The segments 835 and 836 for channel A and channel B, respectively, each may span a single TDRB while the segment 838 for channel C may span two TDRBs. Each symbol 824 and 834 may have its own CP 829 and 839 and, if the GDMRS is transmitted in a partial symbol, the GDMRS may have its own CP as well. As shown, the channel data segments 826, 828, 835, 836, and 838 do not have individual CPs separate from the symbol CPs 829 and 839 as described in relation to FIG. 7.

Figure 9A:
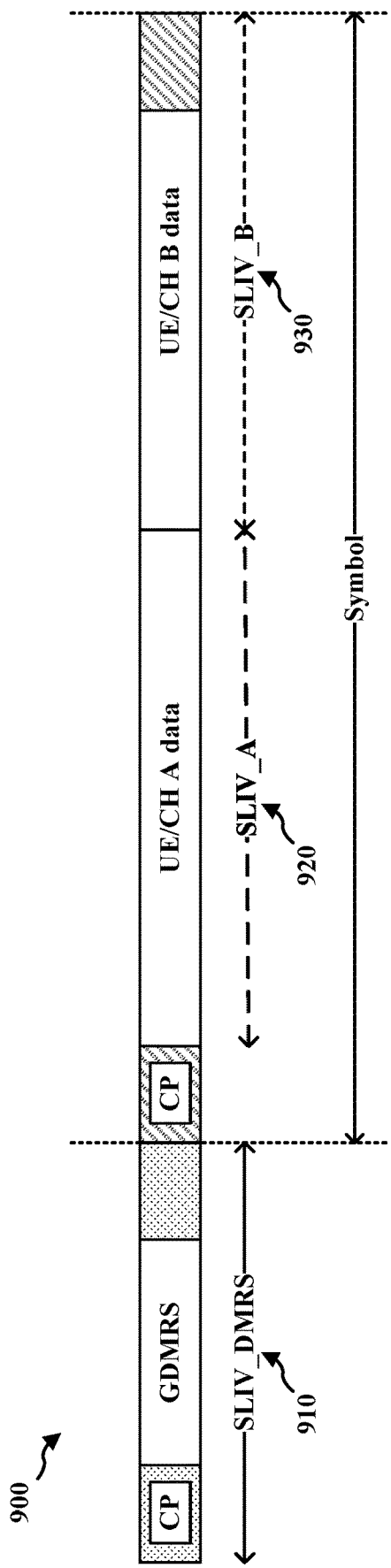
FIG. 9A is a diagram illustrating an example of a first method of identifying the positions of the GDMRS and the data for each UE and/or channel multiplexed in a symbol.
Figure 9B:
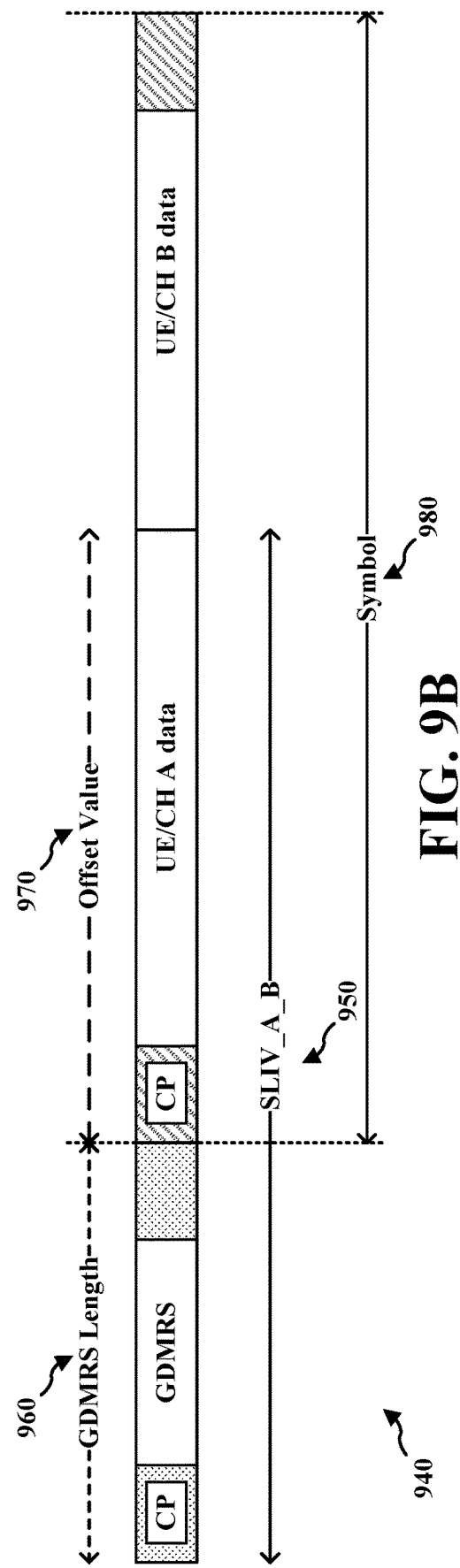
FIG. 9B is a diagram illustrating an example of a second method of identifying the positions of the GDMRS and the data for each UE and/or channel multiplexed in a symbol.

FIG. 9A is a diagram 900 illustrating an example of a first method of identifying the positions of the GDMRS and the data for each UE and/or channel multiplexed (e.g., included) in a symbol. FIG. 9B is a diagram 940 illustrating an example of a second method of identifying the positions of the GDMRS and the data for each UE and/or channel multiplexed (e.g., included) in a symbol.

FIG. 9A illustrates a set of three SLIV values 910, 920, and 930 that define the start position and the length for the GDMRS, the data for a first UE or channel (e.g., UE/CH A), and the data for a second UE or channel (e.g., UE/CH B), respectively.

Each SLIV 910, 920, and 930 may be transmitted by a BS and/or UE and received by a UE and/or BS via any of RRC signaling, a MAC-CE, or DCI/UCI (i.e., through a PDCCH/PUCCH), as one of ordinary skill in the art would understand to be appropriate for the type of communication in which the SLIVs are being transmitted and received. For each additional UE or channel for which data may be included in the symbol, an additional SLIV may be provided to indicate the start position and length of the data for the additional UE or channel. Each SLIV may be a particular value that specifies the start position and length of a data segment in terms of TDRBs and may be defined differently than a SLIV for specifying start positions and lengths in terms of symbols.

FIG. 9B illustrates a set of three values 950, 960, and 970 that are used to define the start position and the length for (1) the GDMRS, (2) the data for a first UE or channel (e.g., UE/CH A), and (3) the data for a second UE or channel (e.g., UE/CH B). The method may be used when the segments for each UE or channel span a same number of TDRBs. A common SLIV 950 (i.e., SLIV_A_B) may be transmitted by either a UE or BS that specifies a start of the GDMRS and a total length of the GDMRS and one segment of the data. In order to identify the data segment length, a length of the GDMRS 960 may also be transmitted. The length of the GDMRS may be pre-configured or dynamic and signaled accordingly (e.g., through RRC signaling for a pre-configured length and through DCI/UCI for dynamically specified lengths). At least one additional offset value 970 specifies an offset from the end of the GDMRS TDRBs to the beginning of a second segment of data following a first segment of data. An offset value may also be provided for the first segment of data in the symbol 980 that indicates the length of the CP, or the length of the CP may be preconfigured or calculated based on a numerology associated with the CP.

Each UE (or BS) receiving values 950, 960, and 970 may extract the data associated with (for) each UE or channel based on the received values. For example, assuming the GDMRS and each segment of the data span two TDRBs in symbol 980 divided into four TDRBs, a value (e.g., SLIV 950) may indicate the starting position of the GDMRS as the midpoint of a symbol preceding symbol 980 and the length of the combined GDMRS and one segment of the data as four TDRBs. UE A (or a BS) would then use the first two TDRBs as a demodulation reference signal and extract the data in the next two TDRBs (e.g., excluding the CP) as being for UE A (for channel A). UE B (or the BS) may also use the first two TDRBs as a demodulation reference signal but may extract the data in the two TDRBs after the two TDRBs including data for UE A (or channel A) based on the offset value 970 (e.g., two TDRBs) as being for UE B (for channel B).

Each value 950, 960, and 970 may be transmitted by a BS and/or UE and received by a UE and/or BS via any of RRC signaling, a MAC-CE, or DCI/UCI (i.e., through a PDCCH/PUCCH), as one of ordinary skill in the art would understand to be appropriate for the type of communication in which the SLIVs are being transmitted and received. For each additional UE or channel for which data may be included in the symbol, an additional offset value may be provided to indicate the start position and length of the data for the additional UE or channel. Alternatively, a single offset value 970 may be sent along with a multiplier associated with each UE or channel, such that a starting location of data for each UE or channel can be identified by using the offset value and multiplier to define a UE-specific, or channel-specific, offset. As for FIG. 9A, SLIV 950 may be specified in terms of TDRBs (e.g., a staring TDRB and a length specified in terms of a number of TDRBs) and may be defined differently than a SLIV for specifying start positions and lengths in terms of symbols.

FIG. 10A illustrates a set of values 1010, 1020, and 1030 defining sets of TDRBs in a virtual TDRB (VTDRB) space that include the VTDRBs for the GDMRS and the VTDRBs for the data for each of a set of UEs or channels within a symbol or set of symbols. FIG. 10B illustrates a set of three values 1040, 1050, and 1060A or 1060B that may be used to define the start position and the length for (1) the GDMRS, (2) the data for a first UE or channel (e.g., UE/CH A), and (3) the data for a second UE or channel (e.g., UE/CH B).

FIG. 10A illustrates a SLIV 1010 that may be defined similarly to SLIV 950 of FIG. 9B, a GDMRS length 1020 that indicates the length of the SLIV 1010 that may be common to both UEs or channels (e.g., the GDMRS or the GDMRS plus the CP), and an offset value 1030 defined in the VTDRB space between the end of the GDMRS and the beginning of the data for the second UE or channel. The UE or BS may map the VTDRBs for each of the GDMRS and the data for each UE or channel to a set of physical TDRBs (PTDRBs). As shown, the GDMRS VTDRBs are mapped to a contiguous set of PTDRBs preceding the PTDRBs for the UE and/or channel data while the data VTDRBs are mapped to an interlaced set of PTDRBs for the different UEs or channels. A UE may extract the data for the UE or channel (or a BS may extract data for a channel) from the PTDRBs to which the VTDRBs for the UE or channel are mapped.

FIG. 10B illustrates a symbol that may be configured to interlace data for multiple different UEs and/or channels (e.g., two UEs and/or channels are depicted but additional UEs or channels may be added following the same principles). As shown, the starting positions and locations of the GDMRS and data are defined using SLIV 1040 that may be defined similarly to SLIV 950 of FIG. 9B, a GDMRS length 1050 that indicates the length of the SLIV 1040 that may be common to both UEs or channels (e.g., the GDMRS or the GDMRS plus the CP), and an offset value 1060A between the end of the GDMRS and the beginning of the data for the second UE or channel or a segment length 1060B that defines the interlacing structure (e.g., defines the periodicity of switching between data for different UEs or channels). Alternatively, an offset value similar to offset value 1030 can be provided along with a definition of the interlacing structure.

As described above with relation to the length of the GDMRS and the CP, the interlace structure may also be pre-configured (e.g., on a semi persistent or dynamic basis) such that no extra configuration data beyond a SLIV (e.g., 1010 or 1040) and an offset value (e.g., 1030 or 1060A) may be transmitted to perform the demodulation and data extraction for a particular UE or channel. The VTDRB to PTDRB mapping and/or interlacing may reduce disparities based on differences in temporal distance from the GDMRS associated with having a first set of TDRBs for a first UE or channel followed by a second set of TDRBs for a second UE or channel. Mapping VTDRBs to PTDRBs may also be used in conjunction with the method of SLIV signaling illustrated above in FIG. 9A and below in relation to FIGS. 11A and 11B.

Figure 11A:
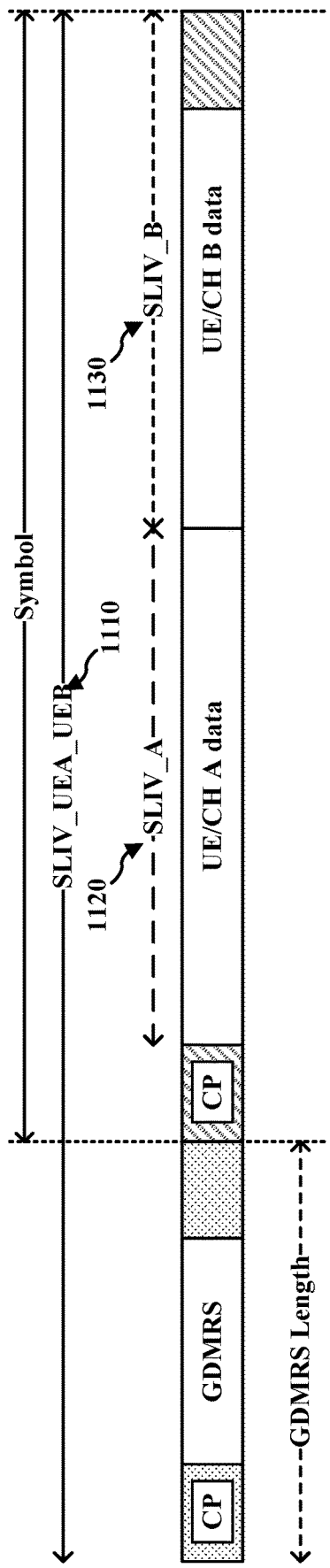
FIG. 11A is a diagram illustrating a set of three values that are used to define the start position and the length for (1) the GDMRS, (2) the data for a first UE or channel, and (3) the data for a second UE or channel.
Figure 11B:
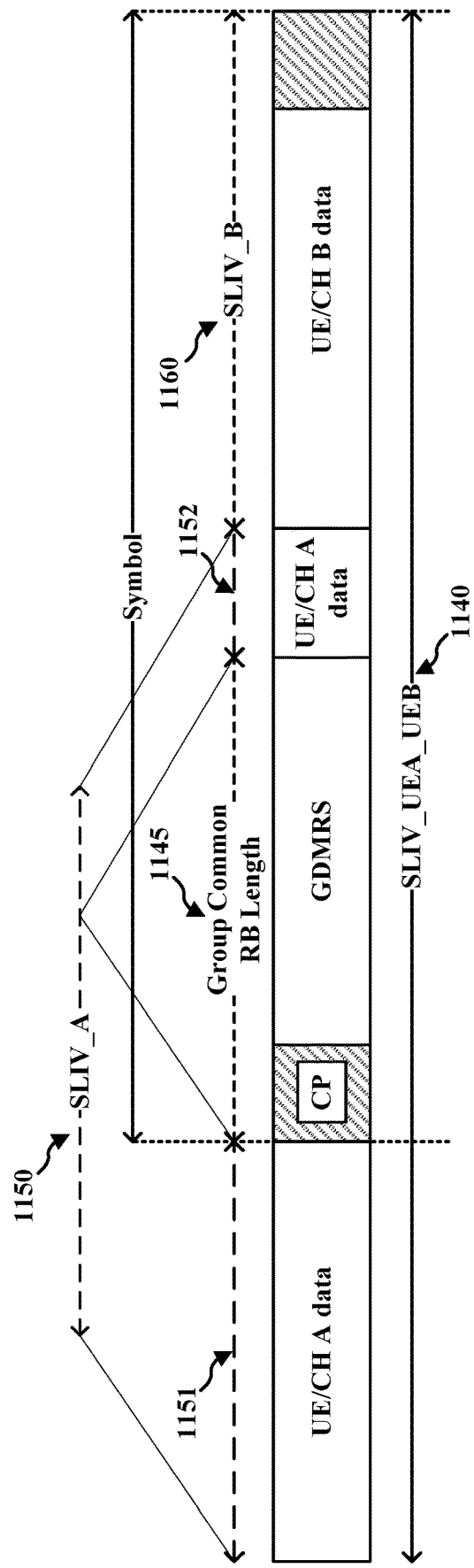
FIG. 11B is a diagram illustrating a set of three values that are used to define the locations of TDRBs including (1) the GDMRS, (2) the data for a first UE or channel, and (3) the data for a second UE or channel.

FIG. 11A is a diagram illustrating a set of three values 1110, 1120, and 1130 that are used to define the start position and the length for (1) the GDMRS, (2) the data for a first UE or channel (e.g., UE/CH A), and (3) the data for a second UE or channel (e.g., UE/CH B). FIG. 11B is a diagram illustrating a set of three values 1140, 1150, and 1160 that are used to define the locations of TDRBs including (1) the GDMRS, (2) the data for a first UE or channel (e.g., UE/CH A), and (3) the data for a second UE or channel (e.g., UE/CH B).

FIG. 11A illustrates a first SLIV 1110 that indicates a starting TDRB and a length of the GDMRS plus the data for the multiple UEs or channels. A GDMRS length 1115 may be provided as a pre-configured (semi-persistent) value or through dynamic indication in control data (e.g., through PDCCH/PUCCH (e.g., through DCI/UCI), MAC-CE, or RRC signaling). SLIV 1120 identifies a starting position and length of the data for a first UE or channel (e.g., UE/CH A) and SLIV 1130 separately identifies the starting length of the data for the second UE or channel (e.g., UE/CH B). As noted above, the SLIVs 1110, 1120, and 1130 may be specified in terms of virtual TDRBs that are subsequently mapped to physical TDRBs.

While FIGS. 9A-11A illustrate a GDMRS that begins at the start location identified in at least one SLIV (e.g., 910, 950, 1010, 1040, and 1110), FIG. 11B illustrates a GDMRS that appears in the middle of a SLIV 1140 specifying a starting TDRB and a length of the GDMRS plus the data for the multiple UEs or channels similarly to SLIV 1110. FIG. 11B illustrates that the common SLIV 1140 may identify a starting TDRB that may be the start of UE or channel data for a first UE or channel (e.g., UE/CH A) while the SLIV 1150 indicates the length of the data for the UE or channel (e.g., UE/CH A) excluding the portion of the TDRBs covered by SLIV 1140 that may be dedicated to the GDMRS.

The location and length of the GDMRS 1145 may be identified, as discussed above, in control data (e.g., based on a frame format and additional variables identifying a number of DMRS per slot and positions of each DMRS in a time domain). As illustrated in FIG. 11B, data for a particular UE or channel (e.g., UE/CH A) may be transmitted in TDRBs both preceding and following the GDMRS and the SLIV 1150 may be defined based on data portion 1151 and 1152 and the starting location of the data for the first UE or channel (UE/CH A). SLIV 1160 may identify the beginning of the data for the second UE or channel, as described in relation to FIG. 11A. As discussed above, any of the SLIVs described in relation to FIGS. 9A-11B can be specified in terms of VTDRBs that are subsequently mapped to PTDRBs.

FIG. 12 is a flowchart 1200 of a method of wireless communication. FIG. 13 is a flowchart 1300 of additional operations that may be performed prior to the operations illustrated in FIG. 12. FIG. 14 is a flowchart 1400 of a method of wireless communication. FIG. 15 is a flowchart 1500 of additional operations that may be performed prior to the operations illustrated in FIG. 14.

The method of FIG. 12 may be performed by a UE (e.g., the UE 104; the apparatus 2002), while the method of FIG. 14 may be performed by a corresponding BS (e.g., BS 102/180, apparatus 2102). Accordingly, the operations of flowcharts 1200 and 1400 will be described in tandem. At 1402, the BS may transmit, to a plurality of UEs, a DMRS (e.g., a GDMRS) that may be scrambled based on a scrambling ID (e.g., a set of scrambling initialization values, a scrambling sequence, etc.) shared by the plurality of UEs. For example, 1402 may be performed by 2140 in FIG. 21. In some configurations, the shared scrambling ID may be defined by a characteristic of a common cell (e.g., a cell that includes the plurality of UEs served by the BS and sharing the GDMRS). In some configurations, the shared scrambling ID may be a value, or set of values, assigned to a UE (e.g., randomly assigned, assigned based on an algorithm that ensures equivalent scrambling, etc.) by a BS. At 1202, the UE may receive, from the BS, the UE-set-specific DMRS (e.g., GDMRS) that may be specific to a set of UEs including the UE performing the method. For example, 1202 may be performed by 2040 in FIG. 20.

At 1404, the BS may time-multiplex data for each of the UEs in the plurality of UEs sharing the UE-set-specific DMRS into different temporal segments (e.g., TDRBs or TDRBGs including multiple TDRBs) within each symbol in a set of symbols. For example, 1404 may be performed by 2140 in FIG. 21. In some aspects the set of symbols includes only a single symbol. For example, data for first and second UEs may be included in symbols 1-8 such that data for the first UE is included in symbols 1-4 and data for the second UE is included in symbols 4-8 with the data being multiplexed, at 1404, in symbol 4, and the set of symbols includes only the single symbol, symbol 4.

The time-multiplexed data may be transmitted at 1406 by the BS to the plurality of UEs. For example, 1406 may be performed by 2140 in FIG. 21. The transmission of the time-multiplexed data, in some configurations occurs in a same frame, subframe, slot, or symbol as the shared DMRS as illustrated in FIGS. 4 and 11B. The UE at 1204 may receive the time-multiplexed data in each symbol of the set of symbols from the BS. For example, 1204 may be performed by 2040 in FIG. 20. As in the example above, the set of symbols including time-multiplexed data may be a single symbol (e.g., symbol 4) that is the end of a transmission of data for a first UE and the beginning of a transmission of data for a second UE.

The UE, at 1206, may demodulate the data based on the received UE-set-specific DMRS. For example, 1206 may be performed by 2040 in FIG. 20. Because the demodulated data includes data for multiple UEs, at 1208 the UE may extract at least one segment of the data in each symbol of the set of symbols for the UE within the demodulated data for subsequent decoding at the UE. For example, 1208 may be performed by 2040 in FIG. 20. The method for identifying the segments for a particular UE are discussed below in relation to FIGS. 13 and 15.

The method of FIG. 13 may be performed by a UE (e.g., the UE 104; the apparatus 2002), while the method of FIG. 15 may be performed by a corresponding BS (e.g., BS 102/180; the apparatus 2102). In some configurations, a UE may receive, at 1302, at least one of (1) time-domain interlace information or (2) VTDRB to PTDRB mapping information that may be transmitted by a BS at 1502. For example, 1302 may be performed by 2040 in FIGS. 20 and 1502 may be performed by 2140 in FIG. 21. The time-domain interlace information, in some configurations, may define any or all of (1) a number of different UEs for which data may be interlaced (2) a number of TDRBs that are used for each segment of the data to be interlaced (e.g., a periodicity). The VTDRB to PTDRB mapping, in some configurations, may identify a mapping between virtual time-domain resources (e.g., VTDRBs) to physical time-domain resources (e.g., PTDRBs) for time-domain resources assigned to each UE in the plurality of UEs. Interlaced data segments and a VTDRB to PTDRB mapping are illustrated in FIGS. 10B and 10A. In configurations using either time-domain interlaced data segments or VTDRB to PTDRB mapping, a SLIV may be defined based on a total length (e.g., total number of TDRBs) of data (or data and GDMRS) for a particular channel, as described above in relation to FIGS. 9B-11B. The SLIV for data for a corresponding UE used in a configuration using a VTDRB to PTDRB mapping may be specified in the virtual-resource domain with the identified virtual-domain resources being mapped to a set of resources in a physical-resource domain before extracting data for the corresponding UE.

As described above in relation to FIGS. 9A-11B, there may be at least three different configurations for signaling (1) the time-domain resources allocated to the GDMRS and (2) the time-domain resources allocated to a particular UE (or channel). In a first signaling configuration described above in relation to FIG. 9A, at 1504, a BS may transmit to the plurality of UEs sharing the UE-set-specific DMRS, (1) a SLIV indicating a starting RB and a number of RBs for segments of data for each UE of the plurality of UEs (e.g., SLIV_A 920) and (2) a same DMRS location-information for each channel data indicating at least one RB for the DMRS (e.g., SLIV_DMRS 910). For example, 1504 may be performed by 2140 in FIG. 21. As described above in relation to FIG. 9A, in some configurations the DMRS location information may be formatted as a SLIV (i.e., SLIV_DMRS 910). In other configurations, DMRS location information may be transmitted as control information through RRC signaling, a MAC-CE, DCI (e.g., within PDCCH), etc. and may be implied by identifying a frame format.

At 1304, the UE may receive, based on operation 1504 performed by the BS, (1) a SLIV indicating a starting RB and a number of RBs for segments of data for the UE of the plurality of UEs and (2) DMRS location-information indicating at least one RB for the DMRS. For example, 1304 may be performed by 2040 in FIG. 20. The UE and BS may proceed to operations 1202 and 1402 respectively as indicated by the letters A and B that are used to connect the operations of FIGS. 13 and 15 to the operations of FIGS. 12 and 14, respectively. The UE may locate (e.g., as part of the demodulation operation at 1206) the DMRS based on the DMRS-location information and demodulates the received data based on the DMRS. The UE then may extract, e.g., at 1208, the at least one segment of data for the UE identified by the received SLIV indicating the starting RB and the number of RBs for the segments of data for the UE.

For a second configuration as described above in relation to FIG. 9B, at 1506, the BS may transmit, to the plurality of UEs sharing the UE-set-specific DMRS, (1) a SLIV (e.g., SLIV_A_B 950) indicating a starting RB and a number of RBs for both the DMRS and the data for a first UE (the length of the DMRS and data for each UE being the same in some configurations), and (2) DMRS-to-data gap information (e.g., offset value 970), for each UE, indicating a gap between the end of the DMRS and at least one segment within the data for the UE. For example, 1506 may be performed by 2140 in FIG. 21. In some configurations, the DMRS may begin at the indicated starting RB and each of the SLIV and the DMRS-to-data gap information (e.g., offset value 970) may have sub-symbol granularity.

At 1306, the UE may receive, based on operation 1506 performed by the BS, (1) a SLIV (e.g., SLIV_A_B 950) indicating a starting RB and a number of RBs for both the DMRS and the data for a first UE (the length of the DMRS and data for each UE being the same in some configurations), and (2) DMRS-to-data gap information (e.g., offset value 970), for each UE, indicating a gap between the end of the DMRS and at least one segment within the data for the UE. For example, 1306 may be performed by 2040 in FIG. 20. In some configurations, the DMRS may begin at the indicated starting RB and each of the SLIV and the DMRS-to-data gap information (e.g., offset value 970) may have sub-symbol granularity. The UE and BS may proceed to operations 1202 and 1402 respectively as indicated by the letters A and B that are used to connect the operations of FIGS. 13 and 15 to the operations of FIGS. 12 and 14, respectively. The UE may locate (e.g., as part of the demodulation operation at 1206) the DMRS based on the SLIV (e.g., SLIV_A_B 950) and demodulate the received data based on the DMRS. The UE may then extract, e.g., at 1208, the at least one segment of data for the UE identified by the received SLIV indicating the starting RB and the number of RBs for the segments of data for the UE and the received DMRS-to-data gap information for the UE (e.g., a "0" value or no DMRS-to-data gap information for UE A and a value of "offset value" 970 for UE B).

In a third signaling configuration described above in relation to FIGS. 11A and 11B, at 1508, a BS may transmit to the plurality of UEs sharing the UE-set-specific DMRS, (1) a first SLIV indicating a starting RB and a number of RBs for the combination of the data and the DMRS (e.g., SLIV_UEA_UEB 1110/1140), and, for each UE, (2) a second SLIV (e.g., SLIVs 1120, 1130, 1150, and 1160) indicating a starting RB and a number of RBs for at least one segment within the data for the UE. For example, 1508 may be performed by 2140 in FIG. 21. As described above in relation to FIG. 11B, in some configurations the DMRS location and length information may be transmitted as control information through RRC signaling, a MAC-CE, DCI (e.g., within PDCCH), etc. and may be implied by identifying a frame format. For data structures such as the one depicted in FIG. 11B, the location and length of the DMRS (e.g., GDMRS) may be used to identify a gap in data for a UE so that the length is specified as the sum of the length of the data before the DMRS and the data after the DMRS such that the UE can identify the specific TDRBs including data for a particular UE. For example, if the first SLIV identifies TDRBs 100-199 for the combination of the data and the DMRS and the SLIV for UE A identifies TDRBs 0-49 (50 TDRBs), the UE may interpret the SLIV for UE A based on a pre-configuration or a dynamic indication that TDRBs 140-159 are used for DMRS. Accordingly, UE A may identify TDRBs 100-139 and TDRBs 160-RB 169 as including the data for UE A. In other words, the second SLIV may be confined within the TDRBs assigned in the first SLIV and excludes the TDRBs used for DMRS.

At 1308, the UE may receive, based on operation 1508 performed by the BS, (1) a first SLIV indicating a starting RB and a number of RBs for the combination of the data and the DMRS (e.g., SLIV_UEA_UEB 1110/1140) and (2) a second SLIV (e.g., one of SLIVs 1120, 1130, 1150, and 1160) indicating a starting RB and a number of RBs for at least one segment within the data for the UE. For example, 1308 may be performed by 2040 in FIG. 20. The UE and BS may proceed to operations 1202 and 1402 respectively as indicated by the letters A and B that are used to connect the operations of FIGS. 13 and 15 to the operations of FIGS. 12 and 14, respectively. The UE may locate (e.g., as part of the demodulation operation at 1206) the DMRS based on DMRS location information (e.g., based on a pre-configuration or a dynamic indication) and demodulate the received data based on the DMRS. The UE may then extract, e.g., at 1208, the at least one segment of data for the UE identified by the received first and second SLIVs indicating the starting RB and the number of RBs for the segments of data for the UE.

In aspects of the invention in which a UE transmits multiplexed data for multiple channels to a BS discussed above in relation to FIG. 6 and below in relation to FIGS. 16 and 18, the UE and BS may proceed from any of operations 1304-1308 and 1504-1508 to operations 1602 and 1802, respectively, as indicated by the letters C and D that are used to connect the operations of FIGS. 13 and 15 to the operations of FIGS. 16 and 18, respectively. In such aspects, the data is multiplexed and transmitted by the UE based on the SLIV information that the UE receives from the BS in the operations 1302-1308. Additionally, the BS receives the data based on the SLIVs transmitted to, and received by, the UE. For example, referring to FIGS. 6, 13, 16, and 18, the UE 602 may receive SLIVs for channels A and B (e.g., as in any of operations 1304-1308 of FIG. 13) in communication 606 from BS 604, multiplex the channel data (e.g., as in operation 1604 of FIG. 16) based on the received SLIVs, and transmit the multiplexed channel data (e.g., as in operation 1606 of FIG. 16) in communication 608 to the BS 604. The BS 604 may receive the multiplexed channel data (e.g., as in operation 1804 of FIG. 18) included in communication 608, demodulate 610 the received data for the multiple channels (e.g., as in operation 1806 of FIG. 18), and extract 610 multiple segments of the data that each correspond to one of the multiple channels based on the received SLIV and GDMRS (e.g., as in operation 1808 of FIG. 18).

While the above description discusses a BS sending multiplexed data for multiple UEs, in some configurations the multiplexed data may be for multiple channels as illustrated in FIGS. 9A, 9B, 11A, and 11B and the UE-set-specific DMRS may be a shared channel DMRS (both the UE-set-specific DMRS and the shared channel DMRS being referred to, generally, as a GDMRS).

Figure 17:
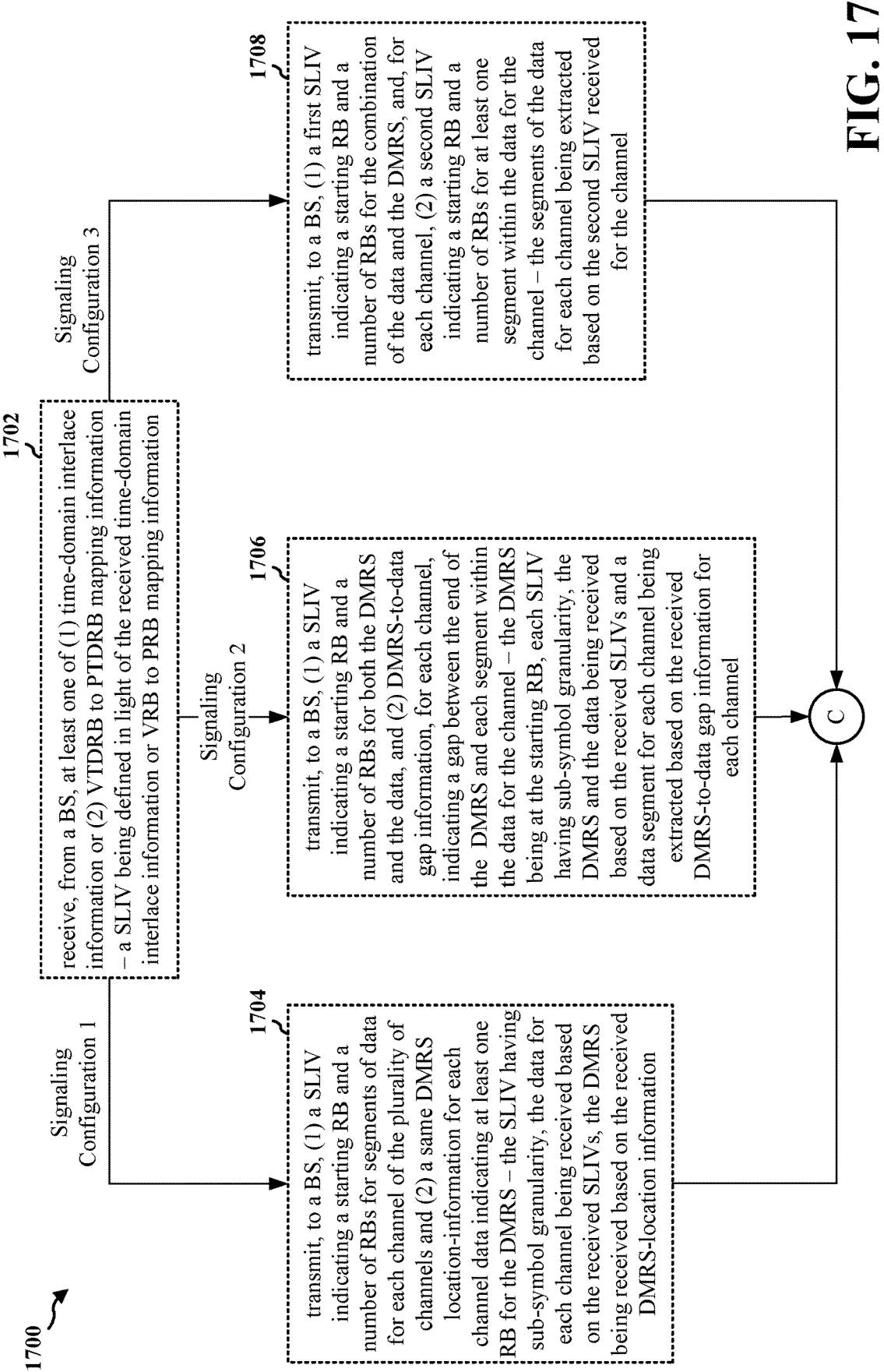
FIG. 17 is a flowchart of additional operations that may be performed prior to the operations illustrated in FIG. 16.

FIG. 16 is a flowchart 1600 of a method of wireless communication. FIG. 17 is a flowchart 1700 of additional operations that may be performed prior to the operations illustrated in FIG. 16. FIG. 18 is a flowchart 1800 of a method of wireless communication. FIG. 19 is a flowchart 1900 of additional operations that may be performed prior to the operations illustrated in FIG. 18.

Figure 18:
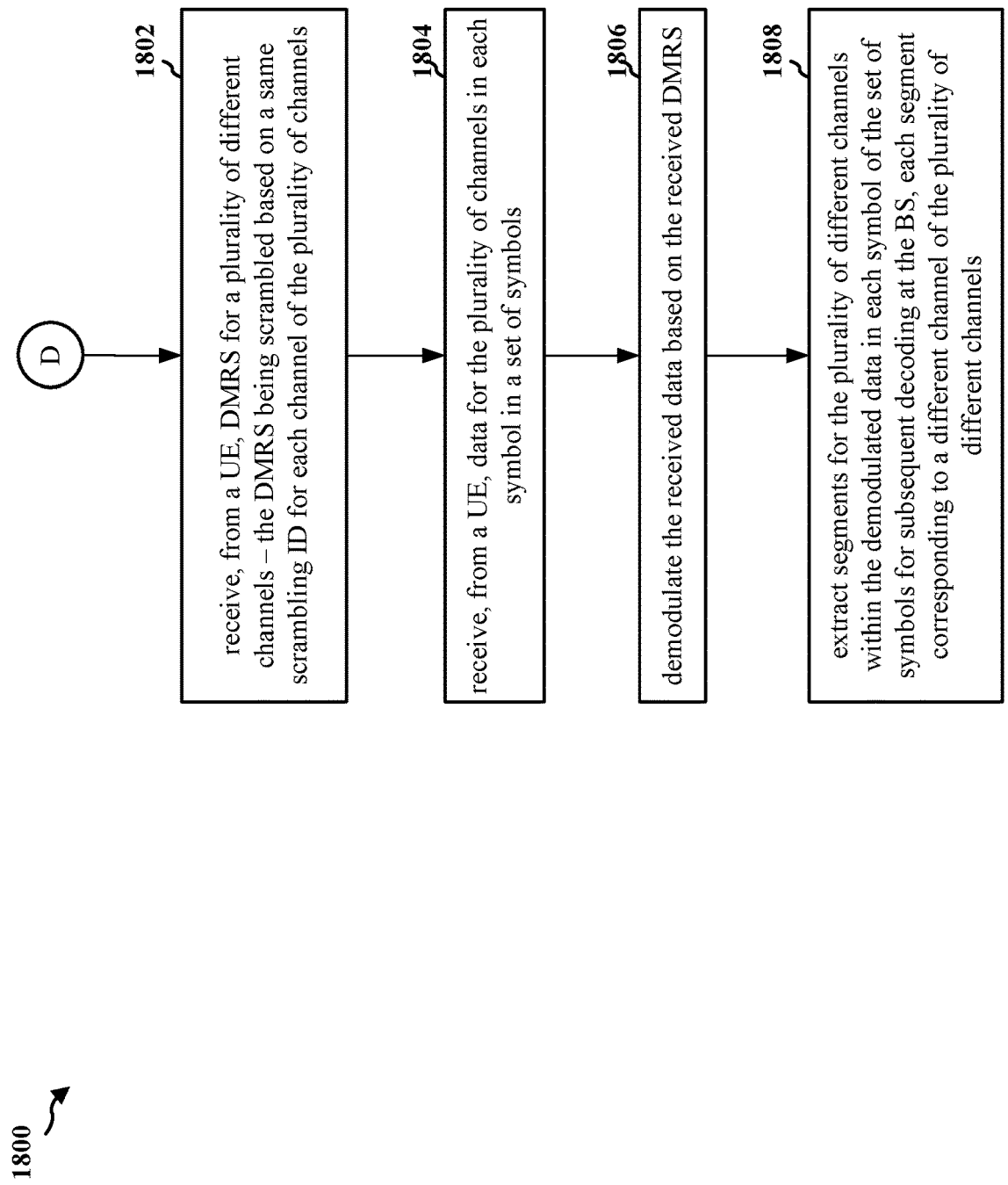
FIG. 18 is a flowchart of a method of wireless communication.
Figure 19:
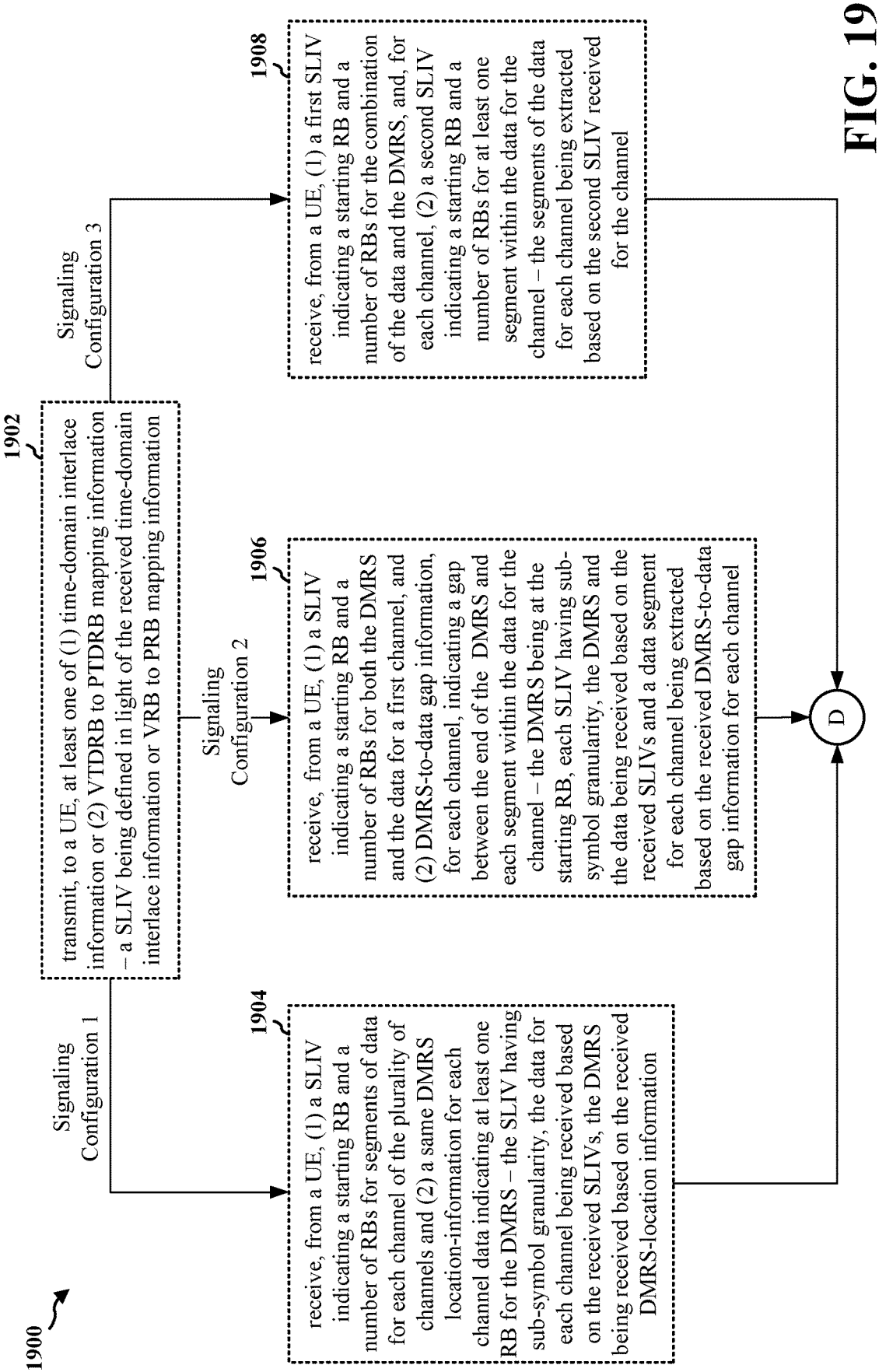
FIG. 19 is a flowchart of additional operations that may be performed prior to the operations illustrated in FIG. 18.

The method of FIG. 16 may be performed by a UE (e.g., UE 104; the apparatus 2002), while the method of FIG. 18 may be performed by a corresponding BS (e.g., the BS 102/180; the apparatus 2102). Accordingly, the operations of flowcharts 1600 and 1800 will be described in tandem. At 1602, the UE may transmit, to a BS, a shared DMRS (e.g., a GDMRS) that may be scrambled based on a scrambling ID (e.g., a set of scrambling initialization values, a scrambling sequence, etc.) shared by a plurality of different channels (e.g., PUCCH, PUSCH, etc.). For example, 1602 may be performed by 2040 in FIG. 20. In some configurations, the shared scrambling ID may be defined by a characteristic of the cell in which the UE operates. In some configurations, the shared scrambling ID may be a value, or set of values, assigned to the UE (e.g., randomly assigned, assigned based on an algorithm that ensures equivalent scrambling, etc.) by a BS. At 1802, the BS may receive, from the UE, DMRS for a plurality of different channels. For example, 1802 may be performed by 2140 in FIG. 21.

At 1604, the UE may time-multiplex data for each of the channels in the plurality of channels sharing the DMRS into different temporal segments (e.g., TDRBs or TDRBGs including multiple TDRBs) within each symbol in a set of symbols. For example, 1604 may be performed by 2040 in FIG. 20. In some aspects the set of symbols includes only a single symbol. For example, data for first and second channels may be included in symbols 1-8 such that data for the first channel is included in symbols 1-4 and data for the second channel is included in symbols 4-8 with the data being multiplexed, at 1604, in symbol 4, and the set of symbols includes only the single symbol, symbol 4.

The time-multiplexed data may be transmitted at 1606 by the UE to the BS. For example, 1606 may be performed by 2040 in FIG. 20. The transmission of the time-multiplexed data, in some configurations occurs in a same frame, subframe, slot, or symbol as the shared DMRS as illustrated in FIGS. 4 and 11B. The BS at 1804 may receive the time-multiplexed data in each symbol of the set of symbols from the UE. For example, 1804 may be performed by 2140 in FIG. 21. As in the example above, the set of symbols including time-multiplexed data may be a single symbol (e.g., symbol 4) that is the end of a transmission of data for a first channel and the beginning of a transmission of data for a second channel.

The BS, at 1806, may demodulate the data based on the shared DMRS. For example, 1806 may be performed by 2140 in FIG. 21. Because the demodulated data includes data for multiple channels, at 1808 the BS may extract at least one segment of the data in each symbol in the set of symbols for each channel within the demodulated data for subsequent decoding at the BS. For example, 1808 may be performed by 2140 in FIG. 21. Methods for identifying the segments for each different channel are discussed, in general, in relation to FIGS. 9A-11B above and, more specifically, in relation to FIGS. 13 and 15 above and in relation to FIGS. 17 and 19 below. The methods illustrated in FIGS. 13 and 15 may be used for UL transmissions scheduled by a BS for which the BS provides the scheduling and SLIV data to the UE. The methods illustrated in FIGS. 17 and 19 may be used for UL transmissions scheduled by a UE for which the UE provides the scheduling and SLIV data to the BS.

The method of FIG. 17 may be performed by a UE (e.g., UE 104; the apparatus 2002), while the method of FIG. 19 may be performed by a corresponding BS (e.g., the BS 102/180; the apparatus 2102). In some configurations, a UE may receive, at 1702, at least one of (1) time-domain interlace information or (2) VTDRB to PTDRB mapping information that may be transmitted by a BS at 1902. For example, 1702 may be performed by 2040 in FIGS. 20 and 1902 may be performed by 2140 in FIG. 21. The time-domain interlace information, in some configurations, may define any or all of (1) a number of different channels for which data may be interlaced (2) a number of TDRBs that are used for each segment of the data to be interlaced (e.g., a periodicity). The VTDRB to PTDRB mapping, in some configurations, may identify a mapping between virtual time-domain resources (e.g., VTDRBs) to physical time-domain resources (e.g., PTDRBs) for time-domain resources assigned to each channel in the plurality of channels. Interlaced data segments and a VTDRB to PTDRB mapping are illustrated in FIGS. 10B and 10A. In configurations using either time-domain interlaced data segments or VTDRB to PTDRB mapping, start and length indicator value (SLIV) may be defined based on a total length (e.g., total number of TDRBs) of data (or data and GDMRS) for a particular channel as described above in relation to FIGS. 9B-10B. The SLIV for data for a corresponding channel used in a configuration using a VTDRB to PTDRB mapping may be specified in the virtual-resource domain with the identified virtual-domain resources being mapped to a set of resources in a physical-resource domain before extracting data for the corresponding channel.

As described above in relation to FIGS. 9A-11B, there may be at least three different configurations for signaling (1) the time-domain resources allocated to the GDMRS and (2) the time-domain resources allocated to a particular channel. In a first signaling configuration described above in relation to FIG. 9A, at 1704, a UE may transmit to the BS, (1) a SLIV indicating a starting RB and a number of RBs for segments of data for each channel of the plurality of channels (e.g., SLIVs 920 and 930) and (2) a same DMRS location-information for each channel data indicating at least one RB for the DMRS (e.g., SLIV_DMRS 910). For example, 1704 may be performed by 2040 in FIG. 20. As described above in relation to FIG. 9A, in some configurations the DMRS location information may be formatted as a SLIV (i.e., SLIV_DMRS 910). In other configurations, DMRS location information may be transmitted as control information through RRC signaling, a MAC-CE, DCI (e.g., within PDCCH), etc. and may be implied by identifying a frame format.

At 1904, the BS may receive, based on operation 1704 performed by the UE, (1) a SLIV indicating a starting RB and a number of RBs for segments of data for each channel of the plurality of channels and (2) DMRS location-information indicating at least one RB for the DMRS. For example, 1904 may be performed by 2140 in FIG. 21. The UE and BS may proceed to operations 1602 and 1802 respectively as indicated by the letters C and D that are used to connect the operations of FIGS. 17 and 19 to the operations of FIGS. 16 and 18, respectively. The BS may locate (e.g., as part of the demodulation operation at 1806) the DMRS based on the DMRS-location information and demodulate the received data based on the DMRS. The BS may then extract, e.g., at 1808, the at least one segment of data for each channel identified by the received SLIV indicating the starting RB and the number of RBs for the segments of data for the channel.

For a second configuration as described above in relation to FIG. 9B, at 1706, the UE may transmit, to the BS, (1) a SLIV (e.g., SLIV_A_B 950) indicating a starting RB and a number of RBs for both the DMRS and the data for a first channel (the length of the DMRS and data for each channel being the same in some configurations), and (2) DMRS-to-data gap information (e.g., offset value 970), for each channel, indicating a gap between the end of the DMRS and at least one segment within the data for the channel. For example, 1706 may be performed by 2040 in FIG. 20. In some configurations, the DMRS may begin at the indicated starting RB and each of the SLIV and the DMRS-to-data gap information (e.g., offset value 970) have sub-symbol granularity.

At 1906, the BS may receive, based on operation 1706 performed by the UE, (1) a SLIV (e.g., SLIV_A_B 950) indicating a starting RB and a number of RBs for both the DMRS and the data for a first channel (the length of the DMRS and data for each channel being the same in some configurations), and (2) DMRS-to-data gap information (e.g., offset value 970), for each channel, indicating a gap between the end of the DMRS and at least one segment within the data for the channel. For example, 1906 may be performed by 2140 in FIG. 21. In some configurations, the DMRS may begin at the indicated starting RB and each of the SLIV and the DMRS-to-data gap information (e.g., offset value 970) may have sub-symbol granularity. The UE and BS may proceed to operations 1602 and 1802 respectively as indicated by the letters C and D that are used to connect the operations of FIGS. 17 and 19 to the operations of FIGS. 16 and 18, respectively. The BS may locate (e.g., as part of the demodulation operation at 1806) the DMRS based on the SLIV (e.g., SLIV_A_B 950) and demodulate the received data based on the DMRS. The BS may then extract, e.g., at 1808, the at least one segment of data for each channel identified by the received SLIV indicating the starting RB and the number of RBs for the segments of data for the channel and the received DMRS-to-data gap information for the channel (e.g., a "0" value or no DMRS-to-data gap information for channel A and a value of "offset value" 970 for channel B).

In a third signaling configuration described above in relation to FIGS. 11A and 11B, at 1708, a UE may transmit to the BS, (1) a first SLIV indicating a starting RB and a number of RBs for the combination of the data and the DMRS (e.g., SLIV_UEA_UEB 1110/1140), and, for each channel, (2) a second SLIV (e.g., SLIVs 1120, 1130, 1150, and 1160) indicating a starting RB and a number of RBs for at least one segment within the data for the channel. For example, 1708 may be performed by 2040 in FIG. 20. As described above in relation to FIG. 11B, in some configurations the DMRS location and length information may be transmitted as control information through RRC signaling, a MAC-CE, DCI (e.g., within PDCCH), etc. and may be implied by identifying a frame format. For data structures such as the one depicted in FIG. 11B, the location and length of the DMRS (e.g., GDMRS) may be used to identify a gap in data for a channel so that the length may be specified as the sum of the length of the data before the DMRS and the data after the DMRS such that the BS can identify the specific TDRBs including data for a particular channel. For example, if the first SLIV identifies TDRBs 100-199 for the combination of the data and the DMRS and the SLIV for channel A identifies TDRBs 0-49 (50 TDRBs), the BS may interpret the SLIV for channel A based on a pre-configuration or a dynamic indication that TDRBs 160-179 are used for DMRS. Accordingly, the BS may identify TDRB 100-199 and TDRB 160-RB 169 as including the data for channel A. In other words, the second SLIV may be confined within the TDRBs assigned in the first SLIV and excludes the TDRBs used for DMRS.

At 1908, the BS may receive, based on operation 1708 performed by the UE, (1) a first SLIV indicating a starting RB and a number of RBs for the combination of the data and the DMRS (e.g., SLIV_UEA_UEB 1110/1140) and, for each channel of the plurality of channels, (2) a second SLIV (e.g., one of SLIVs 1120, 1130, 1150, and 1160) indicating a starting RB and a number of RBs for at least one segment within the data for the channel. For example, 1908 may be performed by 2140 in FIG. 21. The UE and BS may proceed to operations 1602 and 1802 respectively, as indicated by the letters C and D that are used to connect the operations of FIGS. 17 and 19 to the operations of FIGS. 16 and 18, respectively. The BS may locate (e.g., as part of the demodulation operation at 1806) the DMRS based on DMRS location information (e.g., based on a pre-configuration or a dynamic indication) and demodulate the received data based on the DMRS. The BS may then extract, e.g., at 1808, the at least one segment of data for each channel identified by the received first and second SLIVs indicating the starting RB and the number of RBs for the segments of data for the channel.

Figure 20:
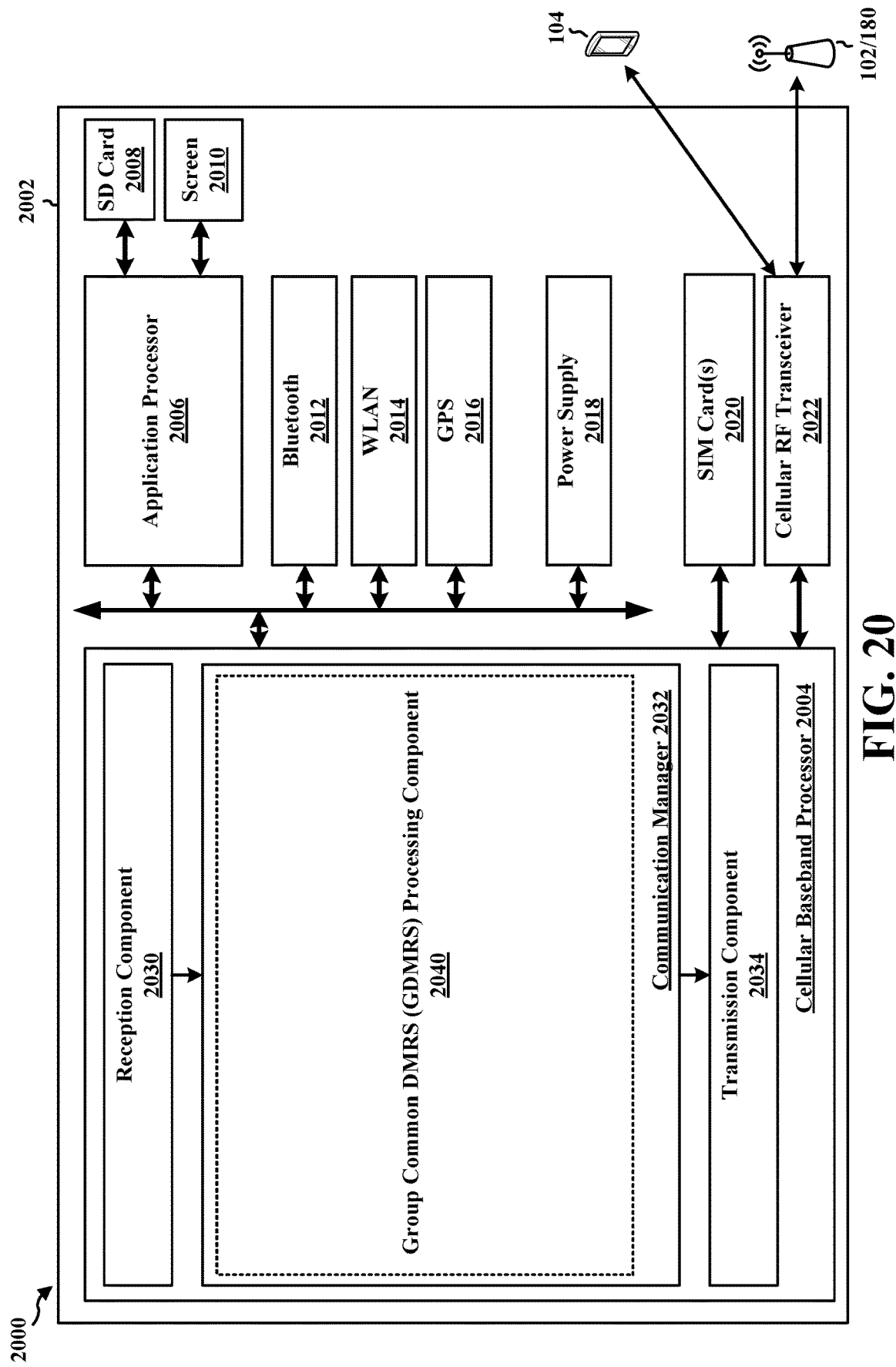
FIG. 20 is a diagram illustrating an example of a hardware implementation for an example apparatus.

FIG. 20 is a diagram 2000 illustrating an example of a hardware implementation for an apparatus 2002. The apparatus 2002 is a UE and includes a cellular baseband processor 2004 (also referred to as a modem) coupled to a cellular RF transceiver 2022 and one or more subscriber identity modules (SIM) cards 2020, an application processor 2006 coupled to a secure digital (SD) card 2008 and a screen 2010, a Bluetooth module 2012, a wireless local area network (WLAN) module 2014, a Global Positioning System (GPS) module 2016, and a power supply 2018. The cellular baseband processor 2004 communicates through the cellular RF transceiver 2022 with the UE 104 and/or BS 102/180. The cellular baseband processor 2004 may include a computer-readable medium/memory. The computer-readable medium/memory may be non-transitory. The cellular baseband processor 2004 is responsible for general processing, including the execution of software stored on the computer-readable medium/memory. The software, when executed by the cellular baseband processor 2004, causes the cellular baseband processor 2004 to perform the various functions described supra. The computer-readable medium/memory may also be used for storing data that is manipulated by the cellular baseband processor 2004 when executing software. The cellular baseband processor 2004 further includes a reception component 2030, a communication manager 2032, and a transmission component 2034. The communication manager 2032 includes the one or more illustrated components. The components within the communication manager 2032 may be stored in the computer-readable medium/memory and/or configured as hardware within the cellular baseband processor 2004. The cellular baseband processor 2004 may be a component of the UE 350 and may include the memory 360 and/or at least one of the TX processor 368, the RX processor 356, and the controller/processor 359. In one configuration, the apparatus 2002 may be a modem chip and include just the baseband processor 2004, and in another configuration, the apparatus 2002 may be the entire UE (e.g., see 350 of FIG. 3) and include the aforediscussed additional modules of the apparatus 2002.

The communication manager 2032 includes a group-common DMRS (GDMRS) processing component 2040 that may be configured to process data associated with GDMRS, e.g., as described in connection with FIGS. 12 and 13 (e.g., operations 1202-1208 and 1302-1308). GDMRS processing component 2040 may be configured to receive DMRS from a base station, the DMRS being UE-set-specific to a plurality of UEs including the UE, the UE-set-specific DMRS being scrambled based on a same scrambling ID and being shared for the plurality of UEs as described in connection with 1202 in FIG. 12. GDMRS processing component 2040 may further be configured to receive, from the base station, data for the plurality of UEs multiplexed in time within each symbol of a set of symbols as described in connection with 1204 in FIG. 12. GDMRS processing component 2040 may further be configured to demodulate the received data based on the received UE-set-specific DMRS as described in connection with 1206 in FIG. 12. GDMRS processing component 2040 may further be configured to extract at least one segment for the UE within the demodulated data in each symbol of the set of symbols for subsequent decoding at the UE as described in connection with 1208 in FIG. 12.

In some configurations, GDMRS processing component 2040 may be configured to process data associated with GDMRS, e.g., as described in connection with FIGS. 16 and 17 (e.g., operations 1602-1606 and 1702-1708). GDMRS processing component 2040 may be configured to transmit, to a base station, DMRS for a plurality of different channels, the transmitted DMRS being scrambled based on a same scrambling ID and being for each channel of the plurality of different channels as described in connection with 1602 in FIG. 16. GDMRS processing component 2040 may be further configured to multiplexing, in time, data for the plurality of different channels into different segments within each symbol of a set of symbols as described in connection with 1604 in FIG. 16. GDMRS processing component 2040 may be configured to transmit the multiplexed-in-time data to the base station as described in connection with 1606 in FIG. 16.

The apparatus may include additional components that perform each of the blocks of the algorithm in the aforementioned flowcharts of FIGS. 12, 13, 16, and 17. As such, each block in the aforementioned flowcharts of FIGS. 12, 13, 16, and 17 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 2002, and in particular the cellular baseband processor 2004, includes means for receiving, from a BS, a GDMRS scrambled based on a scrambling ID specific to a set of apparatus (e.g., UEs) including the apparatus 2002. The apparatus 2002, and in particular the cellular baseband processor 2004, further includes means for receiving, from a BS, data for each of the apparatus in the set of apparatus in each symbol in a set of symbols. The apparatus 2002, and in particular the cellular baseband processor 2004, further includes means for demodulating the received data based on the received GDMRS. The apparatus 2002, and in particular the cellular baseband processor 2004, further includes means for extracting at least one segment for the apparatus within the demodulated data in each symbol of the set of symbols for subsequent decoding at the apparatus. The aforementioned means may be one or more of the aforementioned components of the apparatus 2002 configured to perform the functions recited by the aforementioned means.

In some configurations, the apparatus 2002, and in particular the cellular baseband processor 2004, includes means for transmitting, to a BS, GDMRS for a plurality of different channels that may be scrambled based on a same scrambling identifier (ID) for each channel of the plurality of different channels. The apparatus 2002, and in particular the cellular baseband processor 2004, further includes means for multiplexing data for the plurality of different channels into different segments within each symbol of a set of symbols. The apparatus 2002, and in particular the cellular baseband processor 2004, further includes means for transmitting the multiplexed data to the base station. The aforementioned means may be one or more of the aforementioned components of the apparatus 2002 configured to perform the functions recited by the aforementioned means. As described supra, the apparatus 2002 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 21:
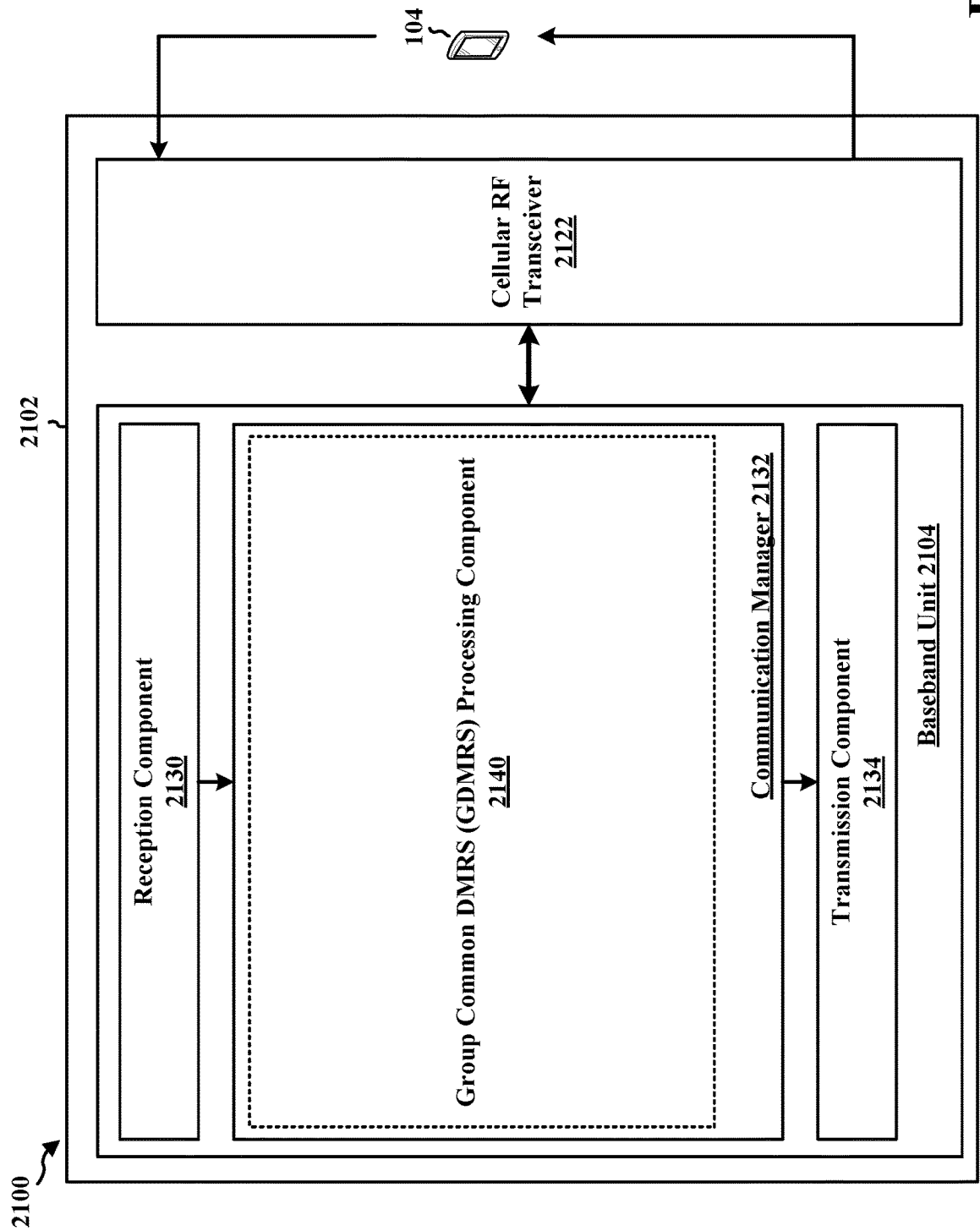
FIG. 21 is a diagram illustrating an example of a hardware implementation for an example apparatus.

FIG. 21 is a diagram 2100 illustrating an example of a hardware implementation for an apparatus 2102. The apparatus 2102 is a BS and includes a baseband unit 2104. The baseband unit 2104 may communicate through a cellular RF transceiver 2122 with the UE 104. The baseband unit 2104 may include a computer-readable medium/memory. The baseband unit 2104 is responsible for general processing, including the execution of software stored on the computer-readable medium/memory. The software, when executed by the baseband unit 2104, causes the baseband unit 2104 to perform the various functions described supra. The computer-readable medium/memory may also be used for storing data that is manipulated by the baseband unit 2104 when executing software. The baseband unit 2104 further includes a reception component 2130, a communication manager 2132, and a transmission component 2134. The communication manager 2132 includes the one or more illustrated components. The components within the communication manager 2132 may be stored in the computer-readable medium/memory and/or configured as hardware within the baseband unit 2104. The baseband unit 2104 may be a component of the BS 310 and may include the memory 376 and/or at least one of the TX processor 316, the RX processor 370, and the controller/processor 375.

The communication manager 2132 includes a group-common DMRS (GDMRS) processing component 2140 that may be configured to process data associated with GDMRS, e.g., as described in connection with FIGS. 14 and 15 (e.g., operations 1402-1406 and 1502-1508). GDMRS processing component 2140 may be configured to transmit, to a UE, DMRS for a plurality of different UEs, the transmitted DMRS being scrambled based on a same scrambling ID and being for each UE of the plurality of UEs as described in connection with 1402 in FIG. 14. GDMRS processing component 2140 may be further configured to multiplex, in time, data for each UE in the plurality of UEs into different segments within each symbol of a set of symbols as described in connection with 1404 in FIG. 14. GDMRS processing component 2140 may further be configured to transmit the multiplexed-in-time data to the UE as described in connection with 1406 in FIG. 14.

GDMRS processing component 2140 may further be configured to process data associated with GDMRS, e.g., as described in connection with FIGS. 18 and 19 (e.g., operations 1802-1808 and 1902-1908). GDMRS processing component 2140 may be configured to receive DMRS from a UE, the DMRS for a plurality of channels, the DMRS being scrambled based on a same scrambling ID and being shared for the plurality of channels as described in connection with 1802 in FIG. 18. GDMRS processing component 2140 may further be configured to receive, from the UE, data for the plurality of channels multiplexed in time within each symbol of a set of symbols as described in connection with 1804 in FIG. 18. GDMRS processing component 2140 may further be configured to demodulate the received data based on the received DMRS as described in connection with 1806 in FIG. 18. GDMRS processing component 2140 may also be configured to extract at least one segment for the UE within the demodulated data in each symbol of the set of symbols for subsequent decoding at the UE as described in connection with 1808 in FIG. 18.

The apparatus may include additional components that perform each of the blocks of the algorithm in the aforementioned flowcharts of FIGS. 14, 15, 18, and 19. As such, each block in the aforementioned flowcharts of FIGS. 14, 15, 18, and 19 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 2102, and in particular the baseband unit 2104, includes means for transmitting, to a plurality of UEs, GDMRS scrambled based on a same scrambling ID shared by the plurality of UEs for channel estimation and demodulation. The apparatus 2102, and in particular the baseband unit 2104, further includes means for multiplexing data for each of the UEs in the plurality of UEs into different segments within each symbol in a set of symbols. The apparatus 2102, and in particular the baseband unit 2104, further includes means for transmitting the multiplexed data to the plurality of UEs. The aforementioned means may be one or more of the aforementioned components of the apparatus 2102 configured to perform the functions recited by the aforementioned means.

In some configurations, the apparatus 2102, and in particular the baseband unit 2104, includes means for receiving, from a UE, GDMRS for a plurality of different channels that may be scrambled based on a same scrambling ID for each channel of the plurality of channels. The apparatus 2102, and in particular the baseband unit 2104, further includes means for receiving, from a UE, data for the plurality of channels in each symbol in a set of symbols. The apparatus 2102, and in particular the baseband unit 2104, further includes means for demodulating the received data based on the received DMRS. The apparatus 2102, and in particular the baseband unit 2104, further includes means for extracting segments for the plurality of different channels within the demodulated data in each symbol of the set of symbols for subsequent decoding at the BS. The aforementioned means may be one or more of the aforementioned components of the apparatus 2102 configured to perform the functions recited by the aforementioned means. As described supra, the apparatus 2102 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Referring again to FIGS. 4-19, a method and apparatus in association with utilizing a GDMRS for time-multiplexed data for multiple UEs or channels is provided. The GDMRS allows for the transmission of data for different channels or different users within a single symbol. The method and apparatus avoid introducing additional cyclic prefixes for each sub-symbol segment of data within a single symbol to avoid adding additional system overhead or incurring additional complexity or restrictions based on FFT and/or DFT size for frequency domain processing. Additionally, referring to FIGS. 9A-19 methods and an apparatus for signaling the location of the GDMRS and data segments for different UEs or channels s provided. The multiple methods of signaling the location of the GDMRS and data segments allow for signaling the location of these segments at a sub-symbol (e.g., time-domain resource block) level. Additionally, the methods simplify the signaling of the segments.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication of a UE including receiving DMRS from a base station, the DMRS being UE-set-specific to a plurality of UEs including the UE, the UE-set-specific DMRS being scrambled based on a same scrambling ID and being shared for the plurality of UEs. The method further includes receiving, from the base station, data for the plurality of UEs multiplexed in time within each symbol of a set of symbols, demodulating the received data based on the received UE-set-specific DMRS, and extracting at least one segment for the UE within the demodulated data in each symbol of the set of symbols for subsequent decoding at the UE.

Aspect 2 is the method of aspect 1, where the received data includes a CP and a segments portion, each segment in the segments portion excluding a CP.

Aspect 3 is the method of any of aspects 1 and 2, where the DMRS is received in a first set of RBs (e.g., TDRBs) and the data is received in a second set of RBs, and each RB of the first set of RBs and the second set of RBs extends over a portion of a symbol and spans a pre-configured bandwidth.

Aspect 4 is the method of any of aspects 1 to 3, further including receiving a SLIV indicating a starting RB (e.g., TDRB) and a number of RBs for the data, the SLIV having sub-symbol granularity, the data being received based on the received SLIV and receiving DMRS-location information indicating at least one RB for the DMRS, the DMRS being received based on the received DMRS-location information.

Aspect 5 is the method of any of aspects 1 to 3, further including receiving a SLIV indicating a starting RB (e.g., TDRB) and a number of RBs for both the DMRS and the data, the DMRS being at the starting RB, the SLIV having sub-symbol granularity, the DMRS and the data being received based on the received SLIV and receiving DMRS-to-data gap information indicating a gap between the DMRS at an end of the starting RB and the at least one segment within the data for the UE, the at least one segment being extracted based on the received DMRS-to-data gap information.

Aspect 6 is the method of aspect 5, further including receiving a DMRS configuration indicating RBs (e.g., TDRBs) and REs for the DMRS within the number of RBs, the configuration being received through at least one of RRC signaling, a MAC-CE, or DCI, where the DMRS is received based on the received DMRS configuration.

Aspect 7 is the method of any of aspects 1 to 3, 5, and 6, further including receiving a SLIV indicating a starting RB (e.g., TDRB) and a number of RBs for both the DMRS and the data, the DMRS being at the starting RB, the SLIV having sub-symbol granularity, the DMRS and the data being received based on the received SLIV and receiving at least one of time-domain interlace information or a VRB to PRB mapping indicating the at least one segment for the UE within the data, the at least one segment being extracted based on the received at least one of the time-domain interlace information or the VRB to PRB mapping.

Aspect 8 is the method of any of aspects 1 to 3, further including receiving a first SLIV indicating a starting RB (e.g., TDRB) and a number of RBs for both the DMRS and the data, the first SLIV having sub-symbol granularity, the DMRS and the data being received based on the received first SLIV and receiving a second SLIV indicating a starting RB and a number of RBs for the at least one segment within the data for the UE, the at least one segment being extracted based on the received second SLIV.

Aspect 9 is a method of wireless communication of a UE including transmitting, to a base station, DMRS for a plurality of different channels, the transmitted DMRS being scrambled based on a same scrambling ID and being for each channel of the plurality of different channels. The method further includes multiplexing, in time, data for the plurality of different channels into different segments within each symbol of a set of symbols and transmitting the multiplexed-in-time data to the base station.

Aspect 10 is the method of aspect 9, where the received data includes a CP and a segments portion, each segment in the segments portion excluding a CP.

Aspect 11 is the method of any of aspects 9 and 10, where the DMRS is received in a first set of RBs (e.g., TDRBs) and the data is received in a second set of RBs, and each RB of the first set of RBs and the second set of RBs extends over a portion of a symbol and spans a pre-configured bandwidth.

Aspect 12 is the method of any of aspects 9 to 11, further including communicating, for each of the plurality of different channels, a SLIV indicating a starting RB and a number of RBs for the data for the channel, the SLIV having sub-symbol granularity, the multiplexed-in-time data being transmitted based on the communicated SLIVs, and communicating DMRS-location information indicating at least one RB for the DMRS for the plurality of different channels, the DMRS being transmitted based on the received DMRS-location information.

Aspect 13 is the method of any of aspects 9 to 11, further including communicating, for the plurality of different channels, a SLIV indicating a starting RB and a number of RBs for both the DMRS and the data, the DMRS being at the starting RB, the SLIV having sub-symbol granularity, and communicating, for each channel of the plurality of different channels, DMRS-to-data gap information indicating a gap between the DMRS at an end of the starting RB and at least one segment corresponding to the channel of the segments within the data, the DMRS and multiplexed-in-time data being transmitted based on the communicated SLIV.

Aspect 14 is the method of aspect 13, further including receiving a DMRS configuration indicating RBs and REs for the DMRS within the number of RBs, the configuration being received through at least one of RRC signaling, a MAC-CE, or DCI, where the DMRS is received based on the received DMRS configuration.

Aspect 15 is the method of any of aspects 9 to 11, further including communicating, for the plurality of different channels, a SLIV indicating a starting RB and a number of RBs for both the DMRS and the data, the DMRS being at the starting RB, the SLIV having sub-symbol granularity, and communicating, for each channel of the plurality of different channels, at least one of time-domain interlace information or a VRB to PRB mapping indicating at least one segment corresponding to the channel of the segments within the data, the DMRS and multiplexed-in-time data being transmitted based on the communicated SLIV.

Aspect 16 is the method of any of aspects 9-11, further including communicating, for the plurality of different channels, a first SLIV indicating a starting RB and a number of RBs for both the DMRS and the data, the first SLIV having sub-symbol granularity, and communicating, for each channel of the plurality of different channels, a second SLIV indicating a starting RB and a number of RBs for at least one segment corresponding to the channel of the segments within the data, the DMRS and multiplexed-in-time data being transmitted based on the communicated SLIV.

Aspect 17 is a method of wireless communication of a BS including transmitting DMRS to a plurality of UEs, the transmitted DMRS being scrambled based on a same ID and being shared by each UE of the plurality of UEs for channel estimation and demodulation at the plurality of UEs. The method further includes multiplexing data for a plurality of UEs into different segments within each symbol of a set of symbols, and transmitting the multiplexed data to the plurality of UEs.

Aspect 18 is the method of aspect 17, where the multiplexed data includes a cyclic prefix (CP) and a segments portion, each segment in the segments portion excluding a CP.

Aspect 19 is the method of aspects 17 or 18, where the DMRS is transmitted in a first set of RBs and the data is transmitted in a second set of RBs, and each RB of the first set of RBs and the second set of RBs extends over a portion of a symbol and spans an entire bandwidth part.

Aspect 20 is the method of any of aspects 17 to 19, further including transmitting, to each UE of the plurality of UEs, a SLIV indicating a starting RB and a number of RBs for the data for the UE, the SLIV having sub-symbol granularity, and transmitting, to each UE of the plurality of UEs, a same DMRS-location information indicating at least one RB for the DMRS for the plurality of UEs.

Aspect 21 is the method of any of aspects 17 to 19, further including transmitting, to each UE of the plurality of UEs, a same SLIV indicating a starting RB and a number of RBs for both the DMRS and the data, the DMRS being at the starting RB, the SLIV having sub-symbol granularity, and transmitting, to each UE of the plurality of UEs, DMRS-to-data gap information indicating a gap between the DMRS at an end of the starting RB and at least one segment for the UE of the segments within the data.

Aspect 22 is the method of aspect 21, further including transmitting, to each UE of the plurality of UEs, a same DMRS configuration indicating RBs and resource elements (REs) for the DMRS within the number of RBs, the configuration being transmitted through at least one of RRC signaling, a MAC-CE, or DCI.

Aspect 23 is the method of any of aspects 17 to 19, further including transmitting, to each UE of the plurality of UEs, a same SLIV indicating a starting RB and a number of RBs for both the DMRS and the data, the DMRS being at the starting RB, the SLIV having sub-symbol granularity, and transmitting, to each UE of the plurality of UEs, at least one of time-domain interlace information or a VRB to PRB mapping indicating at least one segment for the UE of the segments within the data.

Aspect 24 is the method of any of aspects 17 to 19, further including transmitting, to each UE of the plurality of UEs, a same first SLIV indicating a starting RB and a number of RBs for both the DMRS and the data, the DMRS being at the starting RB, the first SLIV having sub-symbol granularity, and transmitting, to each UE of the plurality of UEs, a second SLIV indicating a starting RB and a number of RBs for at least one segment for the UE of the segments within the data.

Aspect 25 is a method of wireless communication of a BS including receiving, from a UE, DMRS for a plurality of different channels, the received DMRS being scrambled based on a same scrambling ID and being for each channel of the plurality of different channels. The method further includes receiving, from the UE, data for the plurality of different channels within each symbol of a set of symbols, demodulating the received data for the plurality of different channels based on the received DMRS, and extracting segments for the plurality of different channels within the demodulated data in each symbol of the set of symbols for subsequent decoding at the BS, each segment corresponding to a different channel of the plurality of different channels.

Aspect 26 is the method of aspect 25, where the received data includes a cyclic prefix (CP) and a segments portion, each segment in the segments portion excluding a CP.

Aspect 27 is the method of aspects 25 or 26, where the DMRS is received in a first set of RBs and the data is received in a second set of RBs, and each RB of the first set of RBs and the second set of RBs extends over a portion of a symbol and spans an entire bandwidth part.

Aspect 28 is the method of any of aspects 25 to 27, further including communicating, for each of the plurality of different channels, a SLIV indicating a starting RB and a number of RBs for the data for the channel, the SLIV having sub-symbol granularity, and communicating a same DMRS-location information indicating at least one RB for the DMRS for the plurality of different channels.

Aspect 29 is the method of any of aspects 25 to 27, further including communicating, for the plurality of different channels, a SLIV indicating a starting RB and a number of RBs for both the DMRS and the data, the DMRS being at the starting RB, the SLIV having sub-symbol granularity, and communicating, for each channel of the plurality of different channels, DMRS-to-data gap information indicating a gap between the DMRS at an end of the starting RB and the segments corresponding to the channel within the data.

Aspect 30 is the method of aspect 29, further including transmitting, to each UE of the plurality of UEs, a DMRS configuration indicating RBs and resource elements (REs) for the DMRS within the number of RBs, the configuration being transmitted through at least one of RRC signaling, a MAC-CE, or DCI, wherein the DMRS is received based on the transmitted DMRS configuration.

Aspect 31 is the method of any of aspects 25 to 27, further including communicating, for the plurality of different channels, a SLIV indicating a starting RB and a number of RBs for both the DMRS and the data, the DMRS being at the starting RB, the SLIV having sub-symbol granularity, and communicating, for each channel of the plurality of different channels, at least one of time-domain interlace information or a VRB to PRB mapping indicating the segments corresponding to the channel within the data.

Aspect 32 is the method of any of aspects 25 to 27, further including communicating, for the plurality of different channels, a first SLIV indicating a starting RB and a number of RBs for both the DMRS and the data, the DMRS being at the starting RB, the first SLIV having sub-symbol granularity, and communicating, for each channel of the plurality of different channels, a second SLIV indicating a starting RB and a number of RBs for at least one segment corresponding to the channel of the segments within the data.

Aspect 33 is an apparatus for wireless communication including at least one processor coupled to a memory and configured to implement a method as in any of aspects 1 to 32.

Aspect 34 is an apparatus for wireless communication including means for implementing a method as in any of aspects 1 to 32.

Aspect 35 is a computer-readable medium storing computer executable code, where the code when executed by a processor causes the processor to implement a method as in any of aspects 1 to 32.

What is claimed is:

1. A method of wireless communication of a user equipment (UE), comprising:
   receiving, from a base station, demodulation reference signals (DMRS), the DMRS being UE-set-specific to a plurality of UEs including the UE, the UE-set-specific DMRS being scrambled based on a same scrambling identifier (ID) and being shared for the plurality of UEs;
   receiving, from the base station, data for the plurality of UEs multiplexed in time within each symbol of a set of symbols;
   demodulating the received data based on the received UE-set-specific DMRS; and
   extracting at least one segment for the UE within the demodulated data in each symbol of the set of symbols for subsequent decoding at the UE.

2. The method of claim 1, wherein the received data includes a cyclic prefix (CP) and a segments portion, each segment in the segments portion excluding a CP.

3. The method of claim 1, wherein the DMRS is received in a first set of resource blocks (RBs) and the data is received in a second set of RBs, and each RB of the first set of RBs and the second set of RBs extends over a portion of a symbol and spans a pre-configured bandwidth.

4. The method of claim 1, further comprising:
   receiving a start and length indicator value (SLIV) indicating a starting resource block (RB) and a number of RBs for the data, the SLIV having sub-symbol granularity, the data being received based on the received SLIV; and
   receiving DMRS-location information indicating at least one RB for the DMRS, the DMRS being received based on the received DMRS-location information.

5. The method of claim 1, further comprising:
   receiving a start and length indicator value (SLIV) indicating a starting resource block (RB) and a number of RBs for both the DMRS and the data, the DMRS being at the starting RB, the SLIV having sub-symbol granularity, the DMRS and the data being received based on the received SLIV; and
   receiving DMRS-to-data gap information indicating a gap between the DMRS at an end of the starting RB and the at least one segment within the data for the UE, the at least one segment being extracted based on the received DMRS-to-data gap information.

6. The method of claim 5, further comprising receiving a DMRS configuration indicating RBs and resource elements (REs) for the DMRS within the number of RBs, the configuration being received through at least one of radio resource control (RRC) signaling, a media access control (MAC) control element (CE) (MAC-CE), or downlink control information (DCI), wherein the DMRS is received based on the received DMRS configuration.

7. The method of claim 1, further comprising:
   receiving a start and length indicator value (SLIV) indicating a starting resource block (RB) and a number of RBs for both the DMRS and the data, the DMRS being at the starting RB, the SLIV having sub-symbol granularity, the DMRS and the data being received based on the received SLIV; and
   receiving at least one of time-domain interlace information or a virtual RB (VRB) to physical RB (PRB) mapping indicating the at least one segment for the UE within the data, the at least one segment being extracted based on the received at least one of the time-domain interlace information or the VRB to PRB mapping.

8. The method of claim 1, further comprising:
   receiving a first start and length indicator value (SLIV) indicating a starting resource block (RB) and a number of RBs for both the DMRS and the data, the first SLIV having sub-symbol granularity, the DMRS and the data being received based on the received first SLIV; and
   receiving a second SLIV indicating a starting RB and a number of RBs for the at least one segment within the data for the UE, the at least one segment being extracted based on the received second SLIV.

9. An apparatus for wireless communication, the apparatus being a user equipment (UE) comprising:
   a memory; and
   at least one processor coupled to the memory and configured to:
      receive, from a base station, demodulation reference signals (DMRS), the DMRS being UE-set-specific to a plurality of UEs including the UE, the UE-set-specific DMRS being scrambled based on a same scrambling identifier (ID) and being shared for the plurality of UEs;
      receive, from the base station, data for the plurality of UEs multiplexed in time within each symbol of a set of symbols;
      demodulate the received data based on the received UE-set-specific DMRS; and
      extract at least one segment for the UE within the demodulated data in each symbol of the set of symbols for subsequent decoding at the UE.

10. The apparatus of claim 9, wherein the received data includes a cyclic prefix (CP) and a segments portion, each segment in the segments portion excluding a CP.

11. The apparatus of claim 9, wherein the DMRS is received in a first set of resource blocks (RBs) and the data is received in a second set of RBs, and each RB of the first set of RBs and the second set of RBs extends over a portion of a symbol and spans a pre-configured bandwidth.

12. The apparatus of claim 9, wherein the at least one processor is further configured to:
   receive a start and length indicator value (SLIV) indicating a starting resource block (RB) and a number of RBs for the data, the SLIV having sub-symbol granularity, the data being received based on the received SLIV; and
   receive DMRS-location information indicating at least one RB for the DMRS, the DMRS being received based on the received DMRS-location information.

13. The apparatus of claim 9, wherein the at least one processor is further configured to:
   receive a start and length indicator value (SLIV) indicating a starting resource block (RB) and a number of RBs for both the DMRS and the data, the DMRS being at the starting RB, the SLIV having sub-symbol granularity, the DMRS and the data being received based on the received SLIV; and
   receive DMRS-to-data gap information indicating a gap between the DMRS at an end of the starting RB and the at least one segment within the data for the UE, the at least one segment being extracted based on the received DMRS-to-data gap information.

14. The apparatus of claim 9, wherein the at least one processor is further configured to:
   receive a start and length indicator value (SLIV) indicating a starting resource block (RB) and a number of RBs for both the DMRS and the data, the DMRS being at the starting RB, the SLIV having sub-symbol granularity, the DMRS and the data being received based on the received SLIV; and
   receive at least one of time-domain interlace information or a virtual RB (VRB) to physical RB (PRB) mapping indicating the at least one segment for the UE within the data, the at least one segment being extracted based on the received at least one of the time-domain interlace information or the VRB to PRB mapping.

15. The apparatus of claim 9, wherein the at least one processor is further configured to:
   receive a first start and length indicator value (SLIV) indicating a starting resource block (RB) and a number of RBs for both the DMRS and the data, the first SLIV having sub-symbol granularity, the DMRS and the data being received based on the received first SLIV; and
   receive a second SLIV indicating a starting RB and a number of RBs for the at least one segment within the data for the UE, the at least one segment being extracted based on the received second SLIV.

* * * * *